United States Patent [19]

Semen et al.

[11] Patent Number: 4,483,949

[45] Date of Patent: Nov. 20, 1984

[54] POLYETHYLENE TEREPHTHALATE BLENDS

[75] Inventors: John Semen; Jesse D. Jones; Edwin D. Hornbaker, all of Baton Rouge, La.

[73] Assignee: Ethyl Corporation, Richmond, Va.

[21] Appl. No.: 524,869

[22] Filed: Aug. 22, 1983

[51] Int. Cl.³ .............................................. C08L 67/02
[52] U.S. Cl. ..................... 523/514; 260/DIG. 35; 523/500; 523/522; 523/523; 523/526; 523/527; 524/504; 524/505; 524/513; 525/176
[58] Field of Search ............... 260/DIG. 35; 523/514, 523/500, 527, 522, 523, 526; 524/504, 505, 513; 525/176

[56] References Cited

U.S. PATENT DOCUMENTS

| | | | |
|---|---|---|---|
| 3,644,574 | 2/1972 | Jackson et al. | 525/175 |
| 3,919,354 | 11/1975 | Moore et al. | 525/244 |
| 4,038,342 | 7/1977 | Schwartz | 523/527 |
| 4,100,229 | 7/1978 | Schwartz | 523/514 |
| 4,131,594 | 12/1978 | Nakamura et al. | 523/522 |
| 4,280,948 | 7/1981 | Dieck | 524/504 |
| 4,346,195 | 8/1982 | Hornbaker et al. | 525/176 |

*Primary Examiner*—Ronald W. Griffin
*Attorney, Agent, or Firm*—Donald L. Johnson; John F. Sieberth; Teresa M. Stanek

[57] ABSTRACT

Thermoplastic compositions comprising, in intimate admixture, polyethylene terephthalate, a rubber-free copolymer of or a rubber-modified graft copolymer of a vinyl aromatic compound and an $\alpha,\beta$-unsaturated cyclic anhydride, a fibrous modifier, and a nucleating agent are disclosed. These compositions display desirable properties, particularly elevated heat deflection temperatures and good surface appearance.

Also disclosed is a process for producing articles by injection molding the compositions at a hold pressure of about 5,000 to about 10,000 psi.

24 Claims, No Drawings

POLYETHYLENE TEREPHTHALATE BLENDS

FIELD

Thermoplastic compositions comprising polyethylene terephthalate and a copolymer of a vinyl aromatic compound and an $\alpha,\beta$-unsaturated cyclic anhydride are disclosed.

BACKGROUND

Polyethylene terephthalate (PET) has become an important raw material for production of moldings, film and fibers. Preparation of PET is described inter alia in Whinfield et al, U.S. Pat. No. 2,465,319 and in Pengilly, U.S. Pat. No. 3,047,539, and in Kirk-Othmer, *Encyclopedia of Chemical Technology*, Second Edition, Vol. 16, pp. 159 et seq. (1968), all disclosures being incorporated herein by reference.

Many applications for injection and extrusion molded parts require heat resistance, and it is in such applications that PET manifests certain undesirable properties. Unreinforced PET has been of limited interest for making such parts due to its low HDT (Heat Deflection Temperature)—about 75° C. at 264 psi. HDT is a measure of an important thermal property of a thermoplastic material wherein a bar of the material, held in flexure under constant load (usually at 264 or 66 psi), deforms a specified amount and the temperature at which this specified deformation occurs is the HDT—see Billmeyer, *Textbook of Polymer Science*, p. 112, John Wiley and Sons, Inc. (1962).

U.S. Pat. No. 3,644,574 discloses blends of 1,4-butanediol polyesters with from about 1 to about 40 weight percent of a vinyl aromatic polymer (e.g., a styrenic polymer) which polymer may be inter alia, a copolymer with maleic anhydride. The blends of this patent exhibit increased HDT over the unblended polyester. However, that patent discloses at Column 1, lines 42–47 that the improvements observed with polybutylene terephthalate are not obtained when the polyester is poly(ethylene terephthalate).

A welcome contribution to the art would be a thermoplastic composition comprising PET that has improved HDT and good surface appearance. These highly desirable compositions are provided by this invention.

SUMMARY OF THE INVENTION

The present invention provides a thermoplastic composition which comprises an intimate admixture of: (a) a polyethylene terephthalate, (b) a copolymer of a vinyl aromatic compound and an $\alpha,\beta$-unsaturated cyclic anhydride, said copolymer being a rubber-modified graft copolymer or a rubber-free copolymer, (c) a fibrous modifier, and (d) a nucleating agent. The invention also provides a process for producing injection molded articles having good surface appearance as well as providing the articles themselves.

Articles molded from the compositions of this invention have a good balance of physical properties—e.g. HDT @ 264 psi and good surface appearance. Preferable compositions of this invention provides articles having an HDT @ 264 psi (as measured by ASTM procedure D 648-72) of at least about 80° C. Injection molded objects having a Gardner 60° Gloss of at least 60% can readily be provided by means of this invention.

DETAILED DESCRIPTION OF THE INVENTION

The polyethylene terephthalate used herein is crystalline and is preferably homopolymeric PET. Halogenated crystalline PET can also be used and is normally formed by condensation of a mixture of a halogenated, preferably brominated, terephthalic acid (e.g., 2,5-dibromoterephthalic acid and 2,3,5,6-tetrabromoterephthalic acid) and terephthalic acid with ethylene glycol. Additionally, providing the resulting copolymer is crystallizable, the polyethylene terephthalate used herein can also contain radicals of other aromatic dicarboxylic acids such as, for example, phthalic acid, isophthalic acid, naphthalene-2,6-dicarboxylic acid, diphenyl-4,4'-dicarboxylic acid and the like as well as their halogenated counterparts. The copolymers, provided the copolymer remains crystallizable, can also contain radicals of other glycols such as, for example, propylene glycol, butylene glycol, dibromoneopentyl glycol, bis(2-hydroxyethyl) ether of tetrabromobisphenol A and tetrabromo-p-xylylene glycol. See for example Kirk-Othmer, *Encyclopedia of Chemical Technology*, Second Edition, Vol. 16, pp. 161–172 (1968).

The polyethylene terephthalates used herein may be virgin or recycled PET's and should be moldable (i.e., injection moldable or moldable by extrusion), and thus generally will have an intrinsic viscosity (I.V.) falling between about 0.25 and 1.5, and more usually between about 0.5 and 1.2, as measured at 25° C. using a solvent consisting of 60 percent by weight phenol and 40 percent by weight of tetrachloroethane. For best results the polyethylene terephthalate should have an I.V. (measured in the foregoing manner) in the range of 0.4 to 1.2, more preferably between 0.5 and 1.1, and for most injection molding applications polyethylene terephthalates in which the I.V. is in the range of 0.5 to 0.9 are deemed most desirable.

Copolymers of a vinyl aromatic compound and an $\alpha,\beta$-unsaturated cyclic anhydride are well known in the art and are described in the literature. In general, they are prepared by conventional bulk or solution techniques using free-radical initiation. For example, styrene-maleic anhydride copolymers can be obtained by simply reacting the two monomers, i.e., styrene and maleic anhydride, at 50° C. in the presence of benzol peroxide. The rate of polymerization may be better controlled if a solvent such as acetone, benzene or xylene is used.

Vinyl aromatic compounds of component (b) can be derived from compounds of the formula:

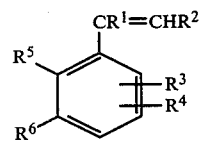

where $R^1$ and $R^2$ are selected from the group consisting of (lower) alkyl groups of from 1 to 6 carbon atoms and hydrogen; $R^3$ and $R^4$ are selected from the group consisting of chloro, bromo, hydrogen and alkyl of from 1 to 6 carbon atoms; $R^5$ and $R^6$ are selected from the group consisting of hydrogen and (lower) alkyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred vinyl aromatic compound.

The cyclic anhydride compounds of component (b) are preferably, β-unsaturated dicarboxylic anhydrides. For example, the term cyclic anhydride identifies anhydrides having the formula:

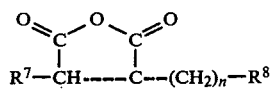

wherein the dotted lines represent a single or a double carbon-to-carbon bond, $R^7$ is selected from the group consisting of hydrogen, alkyl or aryl radicals containing up to 8 carbon atoms, $R^8$ is selected from the group consisting of hydrogen, vinyl, alkyl, alkenyl, alkylcarboxylic or alkenyl carboxylic of from 1 to 12 carbon atoms and n is an integer of from 0 to about 10. Examples include maleic anhydride, methyl maleic anhydride (also known as citraconic anhydride), dimethyl maleic anhydride, itaconic anhydride, phenylmaleic anhydride, aconitic anhydride, and mixtures thereof. Maleic anhydride is preferred.

Copolymers of vinyl aromatic compounds and α,β-unsaturated cyclic anhydrides which can be used are described in U.S. Pat. No. 2,769,804; 2,971,939 and 3,336,267, the disclosures of which are incorporated herein by reference.

The rubber-modified copolymers may be graft rubber modified or the rubber component may be both blended and grafted in the copolymer. In preparing the rubber-modified copolymers, use of such rubbers as polybutadiene, an isobutylene-isoprene copolymer, a styrene-butadiene copolymer, a butadiene-acrylonitrile copolymer, an ethylene-propylene copolymer, a polyisoprene, ethylene-propylene diene monomer terpolymers (EPDM) and the like can be employed. For a description of a typical method of preparing the rubber-modified graft copolymers see U.S. Pat. No. 3,919,354 which is incorporated herein by reference.

Component (b) copolymers can comprise from about 40 to about 5 percent by weight of the α,β-unsaturated cyclic anhydride and from about 60 to about 95 percent by weight of a vinyl aromatic compound in the resin phase and, when rubber is present, up to about 50 percent by weight of rubber in the total graft copolymer. Preferred rubber-modified copolymers used herein contain from about 5 to about 35 and more preferably about 10 to about 30 percent by weight of the α,β-unsaturated cyclic anhydride and about 95 to about 65 percent by weight and more preferably about 90 to about 70 by weight of the vinyl aromatic compound in the resin phase and from about 4 to about 30 percent by weight of rubber in the total graft copolymer. Preferred rubber-free copolymers used herein contain from about 5 to about 35 and more preferably about 10 to about 30 percent by weight of the α,β-unsaturated cyclic anhydride and from about 95 to about 65 percent and more preferably about 90 to about 70 percent by weight of a vinyl aromatic compound.

Rubber-modified graft vinyl aromatic α,β-unsaturated cyclic anhydride copolymers utilizable in the composition of this invention were supplied by, for example, ARCO Polymers, Inc. (ARCO). Examples of styrene-maleic anhydride copolymers (SMA copolymers) from ARCO include: DYLARK DKB 218, reported to comprise about 10 percent by weight of rubber in the total graft copolymer, 17 percent by weight of maleic anhydride and 83 percent by weight of styrene in the resin phase; DYLARK 338S, reported to comprise 4 percent by weight of rubber in the total graft copolymer, 14 percent by weight of maleic anhydride and 86 percent by weight of styrene in the resin phase; DYLARK 350, reported to comprise 15 percent by weight of rubber in the total graft copolymer, 13 percent by weight of maleic anhydride and 87 percent by weight of styrene in the resin phase; DYLARK 378, believed to have the same proportions of styrene, maleic anhydride and rubber as DYLARK 350; and DYLARK DKB 1117, reported to comprise 15 percent by weight of rubber in the total graft copolymer, 20 percent by weight of maleic anhydride and 85 percent by weight of styrene in the resin phase. Another useful SMA copolymer is Dow Experimental Resin XP-5272.08 made by Dow Chemical Company. This is a high impact SMA copolymer believed to contain about 23 percent by weight of maleic anhydride and about 77 percent by weight of styrene in the resin phase and about 15 percent by weight of polybutadiene in the total graft copolymer.

Examples of rubber-free copolymers of (b) include SMA copolymers, supplied by, for example, ARCO. Examples include: DYLARK DKB 290, reported to comprise about 18 percent by weight maleic anhydride and about 82 percent by weight styrene; DYLARK 332, reported to comprise about 14 percent by weight maleic anhydride and 86 percent by weight styrene and DYLARK 134 reported to comprise about 17 percent by weight maleic anhydride, the balance being styrene.

The modifier of (c) must have an aspect ratio significantly greater than one and is either glass fibers or processed mineral fibers (PMF) or may be a combination of the two but preferably glass fibers. The glass fibers are either chopped strands or milled with chopped strands being preferred. It is contemplated that other mineral fillers having an aspect ratio significantly greater than one, either alone or in combination with any of the aforementioned modifiers, may function as the modifier of (c).

It is most preferred to use fibrous glass filaments of lime-aluminum borosilicate glass that are relatively soda free. This is known as "E" glass. The length of the glass filaments and whether they are bundled into fibers and the fibers bundled in turn to roving, etc., is not critical to this invention. However, it has been found convenient to use glass strands of at least 1/16 inch in length, with at least ⅛ inch being preferred. It is to be understood that during compounding considerable fragmentation of the strands will occur and that even further reduction of length occurs in the final injection molded article.

Examples of glass fibers utilizable in the compositions of this invention include those supplied by Owens-Corning Fiberglas, Corp. such as OCF 419 AA (3/16 inch chopped strands), OCF 431 CA (1/16 inch milled glass fiber), OCF 731 CA (1/16 inch milled glass fiber), OCF 739 BA (1/16 inch milled glass fiber); and OCF 885 EB (¼ inch chopped strands); those supplied by PPG Industries, Inc. such as PPG 3540 (⅛ inch chopped strands), PPG X 3012 (⅛ inch chopped strands) and PPG 3541 (¼ inch chopped strands); and those supplied by Certainteed Corporation, Valley Forge, Pa. such as Certainteed 931-A1 (⅛ inch chopped strands) and Certainteed 963-A4 (3/16 inch chopped strands).

Alkali metal salts of monocarboxylic acids, such as alkali metal salts of aliphatic monocarboxylic acids and alkali metal salts of aromatic carboxylic acids, are useful as nucleating agents in the compositions of the invention. Examples include but are not limited to: sodium acetate, sodium propionate, sodium-n-butyrate, sodium caprylate, sodium myristate, potassium stearate, sodium stearate, sodium montanate, sodium benzoate and the like. Additional useful alkali metal salts of carboxylic acids may include, for example, the potassium salts of aliphatic monocarboxylic acids, such as, for example, acetic acid, propionic acid, butyric and caprylic acid, myristic acid, montanic acid benzoic acid and the like; the sodium or potassium salts of aliphatic monocarboxylic acids, such as, for example, formic acid, valeric acid, caproic acid, enanthic acid, pelargonic acid, capric acid, undecanoic acid, lauric acid, tridecanoic acid, pentadecanoic acid, palmitic acid, margaric acid, nonadecanoic acid, arachidic acid, heneicosanoic acid, behenic acid, triconanic acid, tetracosanic acid, pentacosanic acid, cerotic acid and the like; the sodium or potassium salts of unsaturated aliphatic monocarboxylic acids, such as, for example, methacrylic acid, acrylic acid and the like; the sodium or potassium salts of aromatic carboxylic acids, such as, for example, toluic and, p-tert-butylbenzoic acid, salicylic acid, vanillic acid, protocatechuic acid, veratric acid, gallic acid, phthalic acid, isophthalic acid, terephthalic acid, homophthalic acid, and the like, the sodium or potassium salts of mildly unsaturated aliphatic monocarboxylic acids, such as, for example, the fatty acids oleic acid, ricinoleic acid, linoleic acid, palmitoleic acid, vaccenic acid, erucic acid and the like; the sodium or potassium salts of aliphatic dicarboxylic acids, such as, for example, oxalic acid, malonic acid, succinic acid, glutaric acid, adipic acid, pimelic acid, suberic acid, azelaic acid, sebacic acid, brassylic acid and the like; the sodium or potassium salt of unsaturated aliphatic dicarboxylic acids, such as, for example, maleic acid, fumaric acid, glutaconic acid and the like; the sodium or potassium salts of aliphatic tricarboxylic acids, such as, for example, tricarballyic acid, citric acid and the like; and the sodium or potassium salts of dimers or trimers of saturated or unsaturated carboxylic acids, such as, for example, dimers and trimers of $C_{18}$ fatty acids, such as, for example oleic and linoleic acids.

Alkali metal salts of aromatic carboxylic acids substituted with halogen and/or nitro groups are useful as nucleating agents, such as, for example sodium 2-chloro-4-nitrobenzoate. Other substituted aromatic monocarboxylic acids may also be effective. Examples include, but are not limited to the sodium and potassium salts of 2-, 3-, or 4-chlorobenzoic acid, 2- or 4-chloro-3,5-dinitrobenzoic acid, 2-chloro-6-fluorobenzoic acid, 2-chloro-3-nitro-benzoic acid, 2-chloro-5-nitrobenzoic acid, 2-chloro-5-nitrobenzoic acid, 3-chloro-2-nitrobenzoic acid, 4-chloro-2-nitrobenzoic acid, 4-chloro-3-nitrobenzoic acid, 5-chloro-2-nitrobenzoic acid, and the like.

Still other useful nucleating agents include but are not limited to: inorganic compounds, such as, for example, boron nitride and the like; the alkali metal salts of carbonic acid, such as, for example, sodium carbonate, and the like; minerals, such as, for example, talc (available as MICROTALC CP-10-40 from Pfizer Inc.), mica and the like; commercially available soaps, such as, for example, IVORY SNOW (manufactured by The Proctor and Gamble Company of Cincinnati, Ohio and believed to comprise the sodium salts of tallow fatty acids and the sodium salts of coconut fatty acids) and the like; ionomer resins (sodium salt), preferably those having a melt flow index of from about 1.0 to about 2.8 g/10 min. as measured by ASTM procedure D 1236, such as, for example, SURLYN 8940 having a melt flow index of 2.5 g/10 min., SURLYN 8020 having a melt flow index of 1.0 g/10 min., SURLYN 8528 having a melt flow index of 1.0 g/10 min. and SURLYN 1605 having a melt flow index of 2.8 g/10 min. (manufactured by E. I. duPont de Nemours and Company) and the like.

It is contemplated that other substances which will prove to be effective nucleating agents for use in this invention include metal salts of carboxylic acids such as zinc, lead, calcium, barium and cupric laurates and stearates, and potassium benzoate; metal salts of inorganic acids such as silver nitrate and stannous chloride; highly polar organic compounds such as m-hydroxybenzoic acid, tetrachlorophthalic anhydride, inositol and phthalimide; sodium and potassium salts of organic polymers containing pendant carboxyl groups such as copolymers of olefins and acrylic or methacrylic acids and copolymers of aromatic olefins and maleic anhydride; and the like. Note in this connection French Pat. No. 2,129,162; British Pat. No. 2,015,013; and *The British Polymer Journal*, Volume 11, pages 146-150 (September 1979).

Preferred nucleating agents are sodium stearate, sodium 2-chloro-4-nitrobenzoate, sodium montanate, potassium stearate, sodium propionate, sodium acetate, sodium n-butyrate, sodium caprylate, sodium myristate, boron nitride, a mixture comprising the sodium salts of tallow fatty acids and the sodium salts of coconut fatty acids (e.g., IVORY SNOW), talc, sodium carbonate and ionomer resins (sodium salt) having melt flow indexes of 2.5, 1.0, and 2.8 g/10 min. based on ASTM procedure D 1236 (e.g., SURLYN 8940, SURLYN 8020, SURLYN 8528 and SURLYN 1605.

Sodium stearate is a preferred nucleating agent. Any standard commercial grade or any heat stable grade of sodium stearate is utilizable in the compositions of this invention provided that the sodium stearate utilized is of a particle size so that at least 30% will pass through a 100 mesh, U.S. Standard Sieve. For example, such sodium stearate can be purchased as "Sodium Stearate T-1" or "Sodium Stearate, Heat-Stable" from Witco Chemical Corporation, Organic Division, New York, N.Y. 10017.

In the compositions of this invention the amount of fibrous modifier is within the range of from about 1 to about 15 percent by weight, based on the weight of components (a) plus (b) plus (c), with from about 1 to about 10 percent by weight being preferred and from about 3 to about 10 percent by weight being more preferred; the amount of PET is preferably within the range of from about 10 to about 90 percent by weight, based on the weight of (a) plus (b) only, with from about 20 to about 80 percent by weight being more preferred, and from about 70 to about 30 percent by weight being most preferred; and the amount of nucleating agent is preferably within the range of from about 0.1 to about 5 parts per 100 parts of PET, with about 0.5 to about 3 parts being more preferred and with about 0.5 to about 2 parts being even more preferred and with about 1 part being most preferred.

It is contemplated that compositions of this invention can also include other ingredients, such as flame retardants, impact modifiers, extenders, processing aids, pigments, stabilizers and the like, for their conventionally employed purposes. Reinforcing fillers, in amounts sufficient to impart reinforcement, can be used, such as carbon filaments, silicates, e.g., acicular calcium silicate, asbestos, titanium dioxide, potassium titanate, titanate whiskers, and glass flakes and fibers.

The compositions of this invention may include impact modifiers, such as, for example, a styrene-butadiene-styrene block copolymer with polycaprolactone end blocks (such as PD0071-81 supplied by Phillips Petroleum Company), a bisphenol A polycarbonate (such as MERLON M40 available from Mobay Chemical Company), and a polyetherester segmented block copolymer (such as HYTREL 4056 available from E. I. duPont de Nemours and Company). Amounts of impact modifiers will generally fall within the range of from about 5 to about 40 percent by weight based on the weight of the total blend. The results obtained in any given situation will, of course, depend upon a variety of factors such as the impact modifier selected, the manner by which it is compounded into the blends, the concentration in which it is employed, and indeed upon the criteria used in measuring or judging the toughness of the resultant blend.

For protection against thermo-oxidative degradation, the customary amounts of stabilizers, preferably 0.001 to 0.5 percent by weight, relative to components (a) plus (b) can be added to the composition according to the invention. Examples of suitable stabilizers are phenols and phenol derivatives, preferably sterically hindered phenols which contain alkyl substituents with 1–6 carbon atoms in the two positions ortho to the phenolic hydroxyl groups, amines, preferably secondary arylamines and their derivatives, phosphates and phosphites, preferably the aryl derivatives thereof and quinones. Non-limiting examples include
4,4'-bis(2,6-di-tert-butylphenol);
1,3,5-trimethyl-2,4,6-tris(3,5-di-tert-butyl-4-hydroxybenzyl)benzene;
4,4'-butylidene-bis(6-tert-butyl-m-cresol);
3,5-di-tert-butyl-4-hydroxybenzyl-phosphonic acid diethyl ester;
N,N'-bis($\beta$-naphthyl)-p-phenylenediamine;
N,N'-bis(1-methyl-heptyl)-p-phenylenediamine;
phenyl-$\beta$-naphthylamine;
4,4'-bis($\alpha,\alpha$-dimethylbenzyl)diphenylamine;
hydroquinone;
p-benzoquinone;
toluhydroquinone;
p-tert-butylpyrocatechol;
chloranil; and
naphthoquinone.

Flame-retarding additives which can be used for the compositions according to the invention comprise a large number of chemical compounds which are well known to those skilled in the art. In general, they contain chemical elements which are used because of their flame-retarding capacity, for example bromine, chlorine, antimony, phosphorus and nitrogen. Preferably, the flame-retarding additives are halogenated organic compounds (brominated or chlorinated), optionally used together with auxiliary compounds sometimes referred to as synergists, such as antimony trioxide, zinc borate, or the like, Elementary phosphorus or phosphorus compounds such as ammonium polyphosphate are also preferred flame retardants. Other examples include bromine or chlorine containing organic phosphate esters, hexaphenoxyphosphazene, and the like.

Compositions of this invention may be prepared by blending the components in a mixer (e.g., a Henschel mixer) and compounding the mixture on an extruder (e.g., a twin-screw compounding extruder such as a 28 mm Werner-Pfleiderer extruder or the like). Thereafter, the extrudate is chopped into pellets and molded on an injection molding machine. Those skilled in the art will appreciate that the PET and SMA copolymer components and the PET/SMA copolymer blends should be dried prior to melt processing.

When injection molded, the compositions of this invention yield articles having good surface appearance. These articles can have a Gardner 60° Gloss of at least about 60% as measured, for example, by a portable Gardner Gloss Unit. Thus, articles having good balance of surface appearance and physical properties—e.g., HDT @ 264 psi are provided for by this invention.

Surface appearance is a term that describes both the molded articles surface gloss and the extent of any surface markings present as a result of the glass fibers or other fibrous modifiers used. The extent of the markings is determined by comparing the molded article to one molded from only PET/SMA copolymer. An article having a good surface appearance will have a good surface gloss and little or no surface markings from the fiberous modifiers used.

A process for producing injection molded articles, as well as the articles themselves, having good surface appearance when injection molded from the compositions of this invention is also provided for. Thus, another embodiment of this invention is a process for producing articles having good surface appearance by injection molding at a hold pressure of about 5,000 psi to about 20,000 psi, with preferred hold pressures being about 5,000 to about 10,000 psi, from a thermoplastic composition comprising:
(a) a polyethylene terephthalate,
(b) a copolymer of a vinyl aromatic compound and an $\alpha,\beta$-unsaturated anhydride said copolymer being a rubber-modified graft copolymer or a rubber-free copolymer,
(c) a fibrous modifier,
(d) a nucleating agent.

Still another embodiment of this invention provides for the articles injection molded from the compositions of this invention.

The thermoplastic compositions of this invention used to produce the articles of this invention, can be prepared by mixing the components to form a premix, compounding the premix and injection molding the compositions at mold temperatures from about 120° F. to about 200° F., preferably from about 120° F. to about 150° F.

Those skilled in the art will appreciate that the exact compounding and molding condition may vary depending on the equipment used (e.g., the size of the extruder, the screw configuration or other physical or mechanical properties). Articles having a desirable balance of surface appearance and physical properties—e.g. HDT @ 264 psi—have been obtained using a 1½" NRM extruder with barrel zone temperatures (rear and front) within the range of about 480° F. to about 550° F. Preferred temperatures for this extruder were found to be a rear zone temperature of about 500° F. and a front zone temperature of about 540° F.

The compositions of this invention may be compounded in single pass or double pass steps. In the single pass method all of the components are extrusion compounded in a one step. In the double pass method the compounding is done in two steps. In the first step of the double pass method components (b) and (c) are compounded together. In the second step components (a) and (d) are compounded with the composition compounded in the first step of the double pass method.

Additional components, such as, for example, impact modifiers, flame retardants, anti-oxidants and the like can be added during the single pass extrusion process or during either of the two extrusion compounding steps of the double pass compounding.

The extrusion compounding is accomplished, for example, by using a non-vacuum-vented extruder such as a 1½ inch NRM Model 55 Plastics Extruder or a vacuum-vented 1¼ inch Killion extruder or a vacuum-vented 3½ inch extruder. The extrusion process may also be carried out under an inert atmosphere, such as, for example, nitrogen.

The present invention is further illustrated in the following examples, which are not to be construed as limiting.

EXAMPLES

Prior to melt processing the PET and SMA copolymer components and blends were dried, for example, either overnight at 110° C. or at least for a minimum of 3½ to about 6 hours or for about 4 hours at 125° C. such that the residual moisture content was low, e.g., ≦0.05% by weight.

Compositions of the following examples were prepared by mixing the components to form a premix, compounding the premix in a 1½ inch NRM Model 55 Plastics Extruder, except where it is indicated otherwise and molding the pellets into test bars in a Cincinnati-Milacron Model No. 250-12 injection molding machine unless indicated otherwise.

Under the heading "PET/SMA Ratio" in the tables that follow the ratio of PET to SMA in the PET/SMA composition is given in weight percent. The amount of PET plus SMA in the PET/SMA composition is given in weight percent in these tables under the heading "Composition". Thus, by way of example, a composition may comprise 95 weight percent PET/SMA with this amount of PET plus SMA being in a PET/SMA weight percent ratio of 70/30.

The designation "phr" in the tables stands for parts per hundred parts by weight of polyethylene terephthalate.

The materials used in these compositions were as follows:

Polyethylene Terephthalate (PET)

VITUF 5900, from Goodyear Chemical Company, having an intrinsic viscosity of 0.59 as measured at 25° C. using a solvent consisting of 60 percent by weight of phenol and 40 percent by weight of tetrachloroethane VITUF 5901, from Goodyear Chemical Company, having an intrinsic viscosity of 0.59 measured by the same procedure as stated for VITUF 5900.

ENKA T-740, from America Enka Co. (Enka, N.C.), having an intrinsic viscosity of 0.60 measured by the same procedure as stated for VITUF 5900

DuPont Grade E, a recycle PET, obtained from clear bottles, from E. I. duPont de Nemours and Company having an intrinsic viscosity of 0.63 to 0.66 measured by the same procedure as for VITUF 5900.

DuPont Grade A, a recycle PET containing a small amount of green bottle material, from E. I. duPont de Nemours and Company having an intrinsic viscosity of 0.63 to 0.66 measured by the same procedure as stated for VITUF 5900

Pure Tech Recycle PET from Pure-Tech Industries (Pinebrook, N.J.) having an intrinsic viscosity of about 0.68 measured by the same procedure as stated for VITUF 5900

Styrene/Maleic Anhydride Copolymer (SMA copolymer)

DYLARK 332
DYLARK 338S
DYLARK DKB 290
DYLARK 350
DYLARK 378
DYLARK DKB 1117
DYLARK DKB 218

Modifiers

Glass Fiber Modifiers
    OCF 419 AA
    OCF 431 CA
    OCF 731 CA
    OCF 739 BA
    OCF 885 EB
    PPG X3012
    PPG 3540
    PPG 3540M
    Certainteed 931-A1
    Certainteed 963-A4
Mineral Modifiers
    BURGESS B2211, a calcined clay of aspect ratio of about 1.2
    WOLLASTONITE P-4, calcium silicate fibers of aspect ratio of about 15
    PMF, processed mineral fiber Nucleating Agents sodium stearate
sodium 2-chloro-4-nitrobenzoate, the acid was obtained from Aldrich Chemical Co. and neutralized with sodium hydroxide
boron nitride
sodium montanate
potassium stearate
IVORY SNOW
sodium benzoate
SURLYN 8940
MICROTALC CP-10-40
SURLYN 8020
SURLYN 8528
sodium propionate
sodium acetate
sodium carbonate
sodium n-butyrate
sodium caprylate and
sodium myristate Impact Modifiers HYTREL 4056, a poly[poly(tetramethylene oxide)-glycol-co-1,4-butanediol terephthalate] from E. I. duPont de Nemours and Company
PD0071-81, a styrene-butadiene-styrene block copolymer with polycaprolacetone end blocks from Phillips Petroleum Company MERLON M40, A Bisphenol A polycarbonate from Mobay Chemical Company PETG 6763, a copolyester from Eastman Chemical Products, Inc.

KODAR A150, a copolyester from Eastman Chemical Products, Inc.

In the tables that follow, physical properties were determined by the following ASTM procedures: Flexural Strength and Flexural Elastic Modulus—D 790-71 (1978); Izod Impact—D 256-78; and Heat Deflection Temperature—D 648-72 (1978).

EXAMPLES 1-4

Table I reports the physical properties of PET/SMA compositions that contain various amounts of glass fiber. The samples were injection molded on a New Britain Injection Molder. The extruder barrel temperature was 500/505 (Rear °F./Front °F.), the hold pressure was 13,000 psi and the mold temperature was 135° F.

TABLE I
Properties of PET/SMA Compositions Containing Glass Fibers But No Nucleating Agent

| | EXAMPLES | | | |
|---|---|---|---|---|
| | 1 | 2 | 3 | 4 |
| PET/SMA Ratio | | | | |
| VITUF 5900, Wt. % | 70 | 70 | 70 | 70 |
| DYLARK 332, Wt. % | 30 | 30 | 30 | 30 |
| Composition | | | | |
| PET/SMA, Wt. % | 100 | 90 | 85 | 80 |
| OCF 419 AA, Wt. % | — | 10 | 15 | 20 |
| Properties | | | | |
| Specific Gravity | 1.266 | 1.321 | 1.358 | 1.397 |
| Flexural Strength, $10^3$ psi | 14.4 | 12.3 | 19.6 | 23.3 |
| Flexural Elastic Modulus, $10^5$ psi | 452 | 663 | 856 | 1030 |
| Izod Impact, ⅛" bar, ft.-lb/in. | 0.3 | 1.0 | 1.1 | 1.4 |
| Izod Impact, ⅛" unnotched bar, ft.-lb/in. | 6.1 | 3.3 | 4.5 | 6.4 |
| HDT @ 264 psi, °C. | 88 | 72 | 80 | 78 |
| HDT @ 66 psi, °C. | 115 | 101 | 117 | 126 |

The data in Table I demonstrate that the HDT @ 264 psi of glass modified alloys having no nucleating agent were substantially lower than unmodified alloy—i.e., alloy containing no glass fiber.

EXAMPLES 5-8

Table II reports physical properties of PET/SMA compositions containing different levels of sodium stearate. The extruder barrel temperature was 500/540 (rear °F./front °F.), the hold pressure was 5,000 psi and the mold temperature was 150° F.

TABLE II
Effects of Sodium Stearate Level On Physical Properties of PET/SMA Compositions

| | EXAMPLES | | | |
|---|---|---|---|---|
| | 5 | 6 | 7 | 8 |
| PET/SMA Ratio | | | | |
| VITUF 5901, Wt. % | 70 | 70 | 70 | 70 |
| DYLARK 338S, Wt. % | 30 | 30 | 30 | 30 |
| Composition | | | | |
| PET/SMA, Wt. % | 95 | 95 | 95 | 95 |
| PPG 3540, Wt. % | 5 | 5 | 5 | 5 |
| Sodium Stearate, phr | 0.5 | 1.0 | 1.5 | 2.0 |
| Properties | | | | |
| Flexural Strength, $10^3$ psi | 14.4 | 12.8 | 12.2 | 10.3 |
| Flexural Elastic Modulus, $10^5$ psi | 5.75 | 5.72 | 5.73 | 5.80 |
| Izod Impact, ⅛" bar, ft.-lb/in. | 0.5 | 0.5 | 0.4 | 0.4 |
| Izod Impact, ⅛" bar, ft.-lb/in. | 0.4 | 0.4 | 0.3 | 0.4 |
| HDT @ 264 psi, °C. | 100 | 107 | 104 | 106 |
| HDT @ 264 psi, °C. (duplicate) | 102 | 107 | 102 | 108 |

The data in Table II demonstrate that about 1 part of sodium stearate per 100 parts PET gives the best balance in HDT (@ 264 psi), Izod Impact and Flexural Strength properties.

EXAMPLES 9-20

Table III reports the physical properties of PET/SMA compositions containing sodium stearate and various modifiers. The extruder barrel temperature was 500/510 (rear °F./front °F.), the hold pressure was 5,000 psi and the mold temperature was 150° F.

TABLE III
Effects of Various Modifiers on PET/SMA Composition Properties

| | Examples | | | | | | | | | | | |
|---|---|---|---|---|---|---|---|---|---|---|---|---|
| | 9 | 10 | 11 | 12 | 13 | 14 | 15 | 16 | 17 | 18 | 19 | 20 |
| PET/SMA Ratio | | | | | | | | | | | | |
| VITUF 5901, Wt. % | 70 | 70 | 70 | 70 | 70 | 70 | 70 | 70 | 70 | 70 | 70 | 70 |
| DYLARK 338S, Wt. % | 30 | 30 | 30 | 30 | 30 | 30 | 30 | 30 | 30 | 30 | 30 | 30 |
| Composition | | | | | | | | | | | | |
| PET/SMA, Wt. % | 100 | 100 | 90 | 90 | 90 | 90 | 90 | 90 | 95 | 90 | 90 | 95 |
| BURGESS B2211, Wt. % | — | — | 10 | — | — | — | — | — | — | — | — | — |
| WOLLASTONITE P-4, Wt. % | — | — | — | 10 | — | — | — | — | — | — | — | — |
| OCF 419 AA, Wt. % | — | — | — | — | 10 | — | — | — | — | — | — | 5 |
| PMF, Wt. % | — | — | — | — | — | 10 | — | — | — | — | — | — |
| PMF$^a$, Wt. % | — | — | — | — | — | — | 10 | — | — | — | — | — |
| WOLLASTONITE P-4$^a$, Wt. % | — | — | — | — | — | — | — | 10 | — | — | — | — |
| OCF 731 CA, Wt. % | — | — | — | — | — | — | — | — | 5 | 10 | — | — |
| OCF 739B A, WT. % | — | — | — | — | — | — | — | — | — | — | 10 | — |
| Sodium Stearate, phr | — | 1.0 | 1.0 | 1.0 | 1.0 | 1.0 | 1.0 | 1.0 | 1.0 | 1.0 | 1.0 | 1.0 |
| Properties | | | | | | | | | | | | |
| Specific Gravity | 1.275 | 1.278 | 1.341 | 1.348 | 1.342 | 1.350 | 1.351 | 1.343 | — | — | — | 1.309 |
| Flexural Strength, $10^3$ psi | 14.3 | 13.1 | 9.3 | 9.1 | 13.0 | 12.5 | 12.0 | 10.1 | — | — | — | 13.5 |
| Flexural Elastic Modulus, $10^5$ psi | 4.2 | 4.4 | 5.1 | 5.0 | 7.1 | 5.5 | 5.6 | 5.1 | — | — | — | 5.6 |
| Izod Impact, ⅛" bar, ft.-lb/in. | 0.5 | 0.3 | 0.3 | 0.4 | 0.7 | 0.4 | 0.3 | 0.3 | 0.3 | 0.4 | 0.4 | 0.4 |
| Izod Impact, ⅛" bar, ft.-lb/in. | 0.8 | 0.3 | 0.3 | 0.3 | 0.6 | 0.3 | 0.3 | 0.3 | 0.3 | 0.3 | 0.3 | 0.4 |

TABLE III-continued

| Effects of Various Modifiers on PET/SMA Composition Properties | | | | | | | | | | | | |
|---|---|---|---|---|---|---|---|---|---|---|---|---|
| | Examples | | | | | | | | | | | |
| | 9 | 10 | 11 | 12 | 13 | 14 | 15 | 16 | 17 | 18 | 19 | 20 |
| HDT @ 264 psi, °C. | 78 | 85 | 85 | 85 | 172 | 94 | 94 | 85 | 89 | 93 | 92 | 148 |
| HDT @ 264 psi, °C. | 114 | 117 | 120 | 111 | 225 | 121 | 200 | 125 | 118 | 146 | 132 | 224 |

[a]Coated with 1.25 percent by weight Dow-Corning Z-6020

The data in Table III demonstrate that OCF 419 AA glass fiber was extremely effective in upgrading PET/SMA composition HDT @ 264 psi. Observation showed that, as compared to unmodified PET/SMA composition, the surface appearance was reduced in these examples. It is believed that this reduced surface appearance is due to inadequate hold pressure during the injection molding process.

EXAMPLES 21–30

Table IV reports physical properties of PET/SMA Alloy compositions containing various glass fibers. The extruder barrel temperature (rear °F./front °F.), hold pressure (psi) and mold temperature (°F.) for examples 21–23 were 500/510, 8,000 and 150, respectively; and for examples 24–30 they were 500/540, 5,000 and 150, respectively.

The data in Table IV demonstrate that PPG 3540, PPG X3012, OCF 419 AA, Certainteed 931-A1 and Certainteed 963-A4 yield comparable results in terms of the physical properties of the molded article. The data also demonstrate that even though the foregoing tested glass fibers are suitable for use in the compositions of this invention, OCF 885 EB is a preferred glass fiber as its use yields HDT (@ 264 psi) properties that are higher. Observation of Examples 24–27 shows that those examples with OCF 885 EB had slightly better surface appearance of the molded parts and much better glass dispersion into the polymer matrix.

EXAMPLES 31–45

Table V reports physical properties of PET/SMA compositions which contain various nucleating agents and different glass fiber loading level. The extruder barrel temperature (rear °F./front °F.), hold pressure (psi) and mold temperature (°F.) were 500/510, 5,000 and 150, respectively.

TABLE IV

| Effects of Various Glass Fibers on PET/SMA Compositions | | | | | | | | | | |
|---|---|---|---|---|---|---|---|---|---|---|
| | Examples | | | | | | | | | |
| | 21 | 22 | 23 | 24 | 25 | 26 | 27 | 28 | 29 | 30 |
| PET/SMA Ratio | | | | | | | | | | |
| ENKA T-740, Wt. % | 70 | 70 | 70 | — | — | — | — | — | — | — |
| VITUF 5901, Wt. % | — | — | — | 70 | 70 | 80 | 80 | 70 | 70 | 70 |
| DYLARK 338S, Wt. % | 30 | 30 | 30 | 30 | 30 | 20 | 20 | 30 | 30 | 30 |
| Composition | | | | | | | | | | |
| PET/SMA, Wt. % | 95 | 95 | 95 | 95 | 95 | 95 | 95 | 95 | 95 | 95 |
| OCF 419 AA, Wt. % | 5 | — | — | — | — | — | — | — | — | — |
| PPG3540, Wt. % | — | 5 | — | 5 | — | 5 | — | 5 | — | — |
| PPG X3012, Wt. % | — | — | 5 | — | — | — | — | — | — | — |
| OCF 885 EB, Wt. % | — | — | — | — | 5 | — | 5 | — | — | — |
| Certainteed 931-Al, Wt. % | — | — | — | — | — | — | — | — | 5 | — |
| Certainteed 963-A4, Wt. % | — | — | — | — | — | — | — | — | — | 5 |
| Sodium Stearate, phr | 1 | 1 | 1 | 1 | 1 | 1 | 1 | 1 | 1 | 1 |
| Properties | | | | | | | | | | |
| Flexural Strength, $10^3$ psi | — | — | — | 13.1 | 12.9 | 11.1 | 12.1 | 13.5 | 12.0 | 11.7 |
| Flexural Elastic Modulus, $10^5$ psi | — | — | — | 5.68 | 5.81 | 5.99 | 5.80 | 5.72 | 5.84 | 5.75 |
| Izod Impact, ¼" bar, ft.-lb/in. | 0.5 | 0.5 | 0.5 | 0.5 | 0.5 | 0.5 | 0.5 | 0.5 | 0.6 | 0.5 |
| Izod Impact, ⅛" bar, ft.-lb/in. | 0.5 | 0.5 | 0.5 | 0.4 | 0.4 | 0.3 | 0.4 | 0.4 | 0.4 | 0.4 |
| HDT @ 264 psi, °C. | 98 | 101 | 97 | 94 | 114 | 97 | 113 | 101 | 112 | 100 |
| HDT @ 264 psi, °C. (duplicate) | 92 | 102 | 94 | 97 | 111 | 108 | 98 | 105 | 108 | 101 |
| HDT @ 66 psi, °C. | 140 | 169 | 226 | — | — | — | — | — | — | — |

TABLE V

| Effects of Nucleating Agents and Glass Loading On Properties of PET/SMA Compositions | | | | | | | | | | | | | | | |
|---|---|---|---|---|---|---|---|---|---|---|---|---|---|---|---|
| | Examples | | | | | | | | | | | | | | |
| | 31 | 32 | 33 | 34 | 35 | 36 | 37 | 38 | 39 | 40 | 41 | 42* | 43* | 44* | 45* |
| PET/SMA Ratio | | | | | | | | | | | | | | | |
| VITUF 5901, Wt. % | 70 | 70 | 70 | 70 | 70 | 70 | 70 | 70 | 70 | 70 | 85 | 70 | 70 | 70 | 70 |
| DYLARK 338S, Wt. % | 30 | 30 | 30 | 30 | 30 | 30 | 30 | 30 | 30 | 30 | 15 | 30 | 30 | 30 | 30 |
| Composition | | | | | | | | | | | | | | | |
| PET/SMA, Wt. % | 100 | 100 | 95 | 95 | 90 | 90 | 100 | 100 | 95 | 90 | 90 | 100 | 99 | 97.5 | 95 |
| OCF 419 AA, Wt. % | — | — | 5 | 5 | 10 | 10 | — | — | 5 | 10 | 10 | — | 1 | 2.5 | 5 |
| Sodium Stearate, | 1 | — | 1 | — | 1 | — | 1 | — | — | — | — | 1 | 1 | 1 | 1 |

TABLE V-continued
Effects of Nucleating Agents and Glass Loading On Properties of PET/SMA Compositions

| | \multicolumn{15}{c}{Examples} |
|---|---|---|---|---|---|---|---|---|---|---|---|---|---|---|---|
| | 31 | 32 | 33 | 34 | 35 | 36 | 37 | 38 | 39 | 40 | 41 | 42* | 43* | 44* | 45* |
| phr | | | | | | | | | | | | | | | |
| Sodium 2-Chloro-4-nitrobenzoate, phr | — | 1 | — | 1 | — | 1 | — | — | — | — | — | — | — | — | — |
| Boron Nitride, phr | — | — | — | — | — | — | — | 1 | 1 | 1 | 1 | — | — | — | — |
| Properties | | | | | | | | | | | | | | | |
| Specific Gravity | 1.278 | 1.288 | 1.309 | 1.318 | 1.342 | 1.351 | 1.278 | 1.272 | 1.305 | 1.337 | 1.382 | 1.274 | 1.280 | 1.289 | 1.305 |
| Flexural Strength, $10^3$ psi | 13.1 | 7.4 | 13.5 | 7.9 | 13.0 | 9.4 | 12.4 | 14.0 | 15.5 | 19.0 | 19.7 | — | — | — | — |
| Flexural Elastic Modulus, $10^5$ psi | 4.4 | 4.7 | 5.6 | 5.8 | 7.1 | 7.2 | 4.6 | 4.4 | 5.6 | 7.1 | 6.8 | — | — | — | — |
| Izod Impact, ¼" bar, ft.-lb/in. | 0.3 | 0.2 | 0.4 | 0.6 | 0.7 | 1.1 | 0.3 | 0.5 | 0.7 | 1.2 | 1.1 | 0.5 | 0.3 | 0.4 | 0.6 |
| Izod Impact, ⅛" bar, ft.-lb/in. | 0.3 | 0.2 | 0.4 | 0.5 | 0.6 | 0.9 | 0.3 | 0.5 | 0.6 | 1.0 | 0.9 | 0.4 | 0.4 | 0.4 | 0.5 |
| HDT @ 264 psi, °C. | 85 | 87 | 148 | 152 | 172 | 187 | 87 | 80 | 91 | 113 | 106 | 78 | 90 | 97 | 105 |
| HDT @ 66 psi, °C. | 117 | 124 | 224 | 229 | 225 | 244 | 119 | 99 | 197 | 245 | 245 | 115 | 116 | 145 | 221 |

*Examples 42–45 utilized heat stable sodium stearate.

The data in Table V demonstrate that as little as 1 percent by weight glass fiber loading level is sufficient to yield a HDT @ 264 psi of 90° C. A glass fiber loading level of 2.5 to 5 percent by weight is preferable, as these levels of glass fiber provide better Izod Impact and substantially better HDT @ 66 psi over the 1 percent by weight glass fiber loading level.

The data also show that sodium stearate, boron nitride and sodium 2-chloro-4-nitrobenzoate increase HDT @ 264 psi—compare Examples 1-4, Table I, which do not contain a nucleating agent.

Observation shows that surface appearance at 5 percent by weight glass fiber loading was slightly better than at 10 percent by weight.

EXAMPLES 46-63

Table VI (Examples 46-57) and Table VII (Examples 58-63) report the properties of PET/SMA compositions containing various SMA and glass fiber components. The barrel extruder temperature (rear °F./front °F.), for example 46, 47, 58 and 59 was 500/500, for example 49 it was 540/550 and for examples 48, 50, 51-57 and 60-63 it was 500/540; the hold pressure (psi) and mold temperature (°F.) for examples 46-63 were 5,000 and 150, respectively.

TABLE VI
Physical Properties of various PET/SMA Compositions

| | \multicolumn{12}{c}{Examples} |
|---|---|---|---|---|---|---|---|---|---|---|---|---|
| | 46 | 47 | 48 | 49 | 50 | 51 | 52 | 53 | 54 | 55 | 56 | 57 |
| PET/SMA Ratio | | | | | | | | | | | | |
| VITUF 5901, Wt. % | 70 | 70 | 70 | 70 | 70 | 70 | 70 | 70 | 70 | 70 | 70 | 70 |
| DYLARK DKB 338S, Wt. % | 30 | — | 30 | — | — | 30 | 30 | 30 | — | — | — | — |
| DYLARK DKB 290, Wt. % | — | 30 | — | — | — | — | — | — | — | — | — | — |
| DYLARK DKB 218, Wt. % | — | — | — | 30 | — | — | — | — | — | — | — | — |
| DYLARK DKB 1117, Wt. % | — | — | — | — | 30 | — | — | — | — | — | — | — |
| DYLARK 350, Wt. % | — | — | — | — | — | — | — | — | 30 | 30 | — | — |
| DYLARK 378, Wt. % | — | — | — | — | — | — | — | — | — | — | 30 | 30 |
| Composition | | | | | | | | | | | | |
| PET/SMA, Wt. % | 95 | 95 | 95 | 95 | 95 | 95 | 95 | 95 | 95 | 95 | 95 | 95 |
| PPG 3540, Wt. % | 5 | 5 | 5 | 5 | 5 | 5 | 5 | 5 | 5 | 5 | 5 | 5 |
| Sodium Stearate, phr | 1 | 1 | 1 | 1 | 1 | 1 | 1 | 1 | 1 | 1 | 1 | 1 |
| Properties | | | | | | | | | | | | |
| Flexural Strength $10^3$ psi | — | — | 13.1 | 9.9 | 14.4 | 12.5 | 12.5 | 13.5 | 15.3 | 15.2 | 11.2 | 15.8 |
| Flexural Elastic Modulus, $10^5$ psi | — | — | 5.68 | 5.71 | 5.44 | 5.62 | 5.76 | 5.72 | 5.22 | 5.33 | 5.30 | 5.44 |
| Izod Impact, ¼" bar, ft.-lb/in. | 0.5 | 0.6 | 0.5 | 0.8 | 0.7 | 0.4 | 0.4 | 0.5 | 0.8 | 0.6 | 0.7 | 0.8 |
| Izod Impact, ⅛" bar, ft.-lb/in. | 0.4 | 0.5 | 0.4 | 0.5 | 0.6 | 0.3 | 0.3 | 0.4 | 0.7 | 0.5 | 0.5 | 0.7 |
| HDT @ 264 psi, °C. | 103 | 112 | 95 | 104 | 114 | 90 | 101 | 101 | 98 | 104 | 99 | 112 |
| HDT @ 264 psi, °C. (duplicate) | 100 | 117 | 97 | 109 | 100 | 95 | 108 | 105 | 106 | 96 | 99 | 97 |
| HDT @ 66 psi, °C. | 195 | 182 | — | — | — | — | — | — | — | — | — | — |

TABLE VII
Physical Properties of Various PET/SMA Compositions

| | \multicolumn{6}{c}{EXAMPLES} |
|---|---|---|---|---|---|---|
| | 58 | 59 | 60 | 61 | 62 | 63 |
| PET/SMA Ratio | | | | | | |
| VITUF 5901, Wt. % | 70 | 70 | 70 | 70 | 70 | 70 |
| DYLARK 338S, Wt. % | 30 | — | 30 | — | — | — |
| DYLARK DKB 290, WT. % | — | 30 | — | — | — | — |
| DYLARK 350, Wt. % | — | — | — | 30 | — | — |
| DYLARK 378, Wt. % | — | — | — | — | 30 | 30 |
| Composition | | | | | | |
| PET/SMA, Wt. % | 95 | 95 | 95 | 95 | 95 | 95 |
| OCF 419 AA, Wt. % | 5 | 5 | — | — | — | — |
| OCF 885 EB, Wt. % | — | — | 5 | 5 | 5 | 5 |
| Sodium Stearate, phr | 1 | 1 | 1 | 1 | 1 | 1 |

TABLE VII-continued

Physical Properties of Various PET/SMA Compositions

| | EXAMPLES | | | | | |
|---|---|---|---|---|---|---|
| | 58 | 59 | 60 | 61 | 62 | 63 |
| Properties | | | | | | |
| Flexural Strength, 10³ psi | — | — | 12.9 | 15.1 | 14.9 | 16.2 |
| Flexural Elastic Modulus, 10⁵ psi | — | — | 5.65 | 5.43 | 5.40 | 5.33 |
| Izod Impact, ¼" bar, ft.-lb./in. | 0.5 | 0.6 | 0.4 | 0.8 | 0.7 | 0.7 |
| Izod Impact, ⅛" bar, ft.-lb /in. | 0.4 | 0.4 | 0.3 | 0.7 | 0.4 | 0.5 |
| HDT @ 264 psi, °C. | 106 | 97 | 94 | 97 | 94 | 108 |
| HDT @ 264 psi, °C. (duplicate) | 110 | 116 | 96 | 98 | 97 | 92 |
| HDT @ 66 psi, °C. | 127 | 184 | — | — | — | — |

The data in Tables VI and VII demonstrate the good physical properties obtained with these SMA and glass fiber components.

EXAMPLES 64-66

Table VIII reports physical properties for PET/SMA compositions derived from recycled PET. The barrel extruder temperature was 500/540 (rear °F./front °F.), the hold pressure was 5,000 psi and the mold temperature was 150° F.

TABLE VIII

Properties of PET/SMA Compositions Derived from Recycle PET

| | EXAMPLES | | |
|---|---|---|---|
| | 64 | 65 | 66 |
| PET/SMA Ratio | | | |
| VITUF 5901, Wt. % | 70 | — | — |
| DuPont Grade A, Wt. % | — | 70 | — |
| DuPont Grade E, Wt. % | — | — | 70 |
| DYLARK 338S, Wt. % | 30 | 30 | 30 |
| Composition | | | |
| PET/SMA, Wt. % | 95 | 95 | 95 |
| PPG 3540, Wt. % | 5 | 5 | 5 |
| Sodium Stearate, phr | 1 | 1 | 2 |
| Properties | | | |
| Flexural Strength, 10³ psi | 12.0 | 11.3 | 8.3 |
| Flexural Elastic Modulus, 10⁵ psi | 5.76 | 5.56 | 5.80 |
| Izod Impact, ¼" bar, ft.-lb/in. | 0.5 | 0.4 | 0.5 |
| Izod Impact, ⅛" bar, ft.-lb/in. | 0.4 | 0.4 | 0.4 |
| HDT @ 264 psi, °C. | 92 | 99 | 105 |
| HDT @ 264 psi, °C. (duplicate) | 99 | 100 | 106 |

The data in Table VIII demonstrate that the du Pont recycle PET grades are essentially similar to VITUF 5901 PET with respect to composition HDT (@ 264 psi) and Izod Impact properties. Observation showed that the du Pont recycle PET grades gave darker (amber) colored compounds than the VITUF 5901. A possible explanation for this observation is contamination from the labels from the recycled bottles.

EXAMPLES 67-74

Table IX reports the reproducibility of HDT @ 264 psi of PET/SMA compositions. The extrusion barrel temperature (rear °F./front °F.) was 500/510, the holding pressure was 5,000 psi and the mold temperature was 150° F.

TABLE IX

Reproducibility of HDT @ 264 psi of PET/SMA Compositions

| | EXAMPLES | | | | | | | |
|---|---|---|---|---|---|---|---|---|
| | 67 | 68 | 69 | 70* | 71* | 72 | 73 | 74 |
| PET/SMA Ratio | | | | | | | | |
| VITUF 5901, Wt. % | 70 | 70 | 70 | 70 | 70 | 70 | 70 | 70 |
| DYLARK 338S, Wt. % | 30 | 30 | 30 | 30 | 30 | 30 | 30 | 30 |
| Composition | | | | | | | | |
| PET/SMA, Wt. % | 95 | 95 | 95 | 95 | 95 | 95 | 95 | 95 |
| OCF 419 AA, Wt. % | 5 | 5 | 5 | 5 | 5 | 5 | 5 | 5 |
| Sodium Stearate, phr | 1 | 1 | 1 | — | 1 | 1 | 1 | 1 |
| Sodium 2-Chloro-4-Nitrobenzoate, phr | — | — | — | 1 | — | — | — | — |
| Properties | | | | | | | | |
| HDT @ 264 psi, °C. | 105 | 93 | 148 | 152 | 112 | 96 | 100 | 104 |
| HDT @ 264 psi, °C. (Duplicate) | — | 87 | 110 | 116 | — | — | — | 110 |

*Same as examples 33 and 34, respectively.

The data in Table IX demonstrate that the HDT @ 264 psi tend to fall within the range of about 100° to 110° C. There is no apparent explanation for the anomalously high HDT properties obtained in Examples 69 and 70 (148° and 152° C., respectively).

EXAMPLES 75-78

Table X reports physical properties for PET/SMA compositions that were extrusion compounded by double passing. In the second-pass the remaining components needed to form the finished PET/SMA composition were extrusion compounded with the composition that was extrusion compounded in the first-pass. For example, in Example 77, glass fiber (GF) and PET were extrusion compounded in the first-pass and in the second-pass SMA and sodium stearate were extrusion compounded with the first-pass composition to form the PET/SMA composition comprising 5 weight percent glass, 95 weight percent of PET/SMA (where the ratio of PET to SMA is 70 weight percent PET and 30 weight percent SMA), and 1 part sodium stearate per 100 parts PET. In a similar fashion, in Example 78, glass fiber (GF) and SMA were extrusion compounded in the first-pass and in the second-pass PET and sodium stearate were extrusion compounded with the composition of the first-pass to form the PET/SMA composition.

The compositions comprised 5% OCF 419 AA glass fiber, 1 phr sodium stearate and 95 parts of a 70% VITUF 5901/30% DYLARK 338S PET/SMA blend. The barrel temperature (rear °F./front °F.) was 500/510 for both extrusion passes, the hold pressure was 5,000 psi and the mold temperature was 150° F.

TABLE X

Physical Properties of Single-Pass vs. Double-Pass Compounding of PET/SMA Compositions

| | EXAMPLES | | | |
|---|---|---|---|---|
| | 75 | 76 | 77 | 78 |
| Composition Compounded in First Pass | | | | |
| VITUF 5901, Wt. % | 66.5 | 70 | 93 | — |
| DYLARK 338S, Wt. % | 28.5 | 30 | — | 85 |
| OCF 419 AA, Wt. % | 5 | — | 7 | 15 |

TABLE X-continued
Physical Properties of Single-Pass vs. Double-Pass Compounding of PET/SMA Compositions

| | EXAMPLES | | | |
|---|---|---|---|---|
| | 75 | 76 | 77 | 78 |
| Sodium Stearate, phr Composition Compounded in Second Pass | 1 | — | — | — |
| VITUF 5901/DYLARK 338S blend*, Wt. % | — | 95 | — | — |
| OCF 419 AA/VITUF 5901 blend*, Wt. % | — | — | 71.5 | — |
| OCF 419 AA/DYLARK 338S blend*, Wt. % | — | — | — | 33.5 |
| VITUF 5901, Wt. % | — | — | — | 66.5 |
| DYLARK 338S, Wt. % | — | — | 28.5 | — |
| OCF 419 AA, Wt. % | — | 5 | — | — |
| Sodium Stearate, phr | — | 1 | 1 | 1 |
| Properties | | | | |
| Specific Gravity | 1.313 | 1.311 | 1.324 | 1.312 |
| Izod Impact, ¼" bar, ft.-lb/in. | 0.5 | 0.6 | 0.6 | 0.4 |
| Izod Impact, ⅛" bar, ft.-lb/in. | 0.4 | 0.4 | 0.4 | 0.3 |
| HDT @ 264 psi, °C. | 94 | 95 | 89 | 93 |
| HDT @ 264 psi, °C. (duplicate) | 93 | 102 | 87 | 95 |
| HDT @ 66 psi, °C. | 183 | 185 | 218 | 182 |

*Composition compounded in first pass.

The lowest HDT (@ 264 psi) properties were obtained in Example 77 in which PET and glass fiber were compounded in the first pass.

EXAMPLES 79–91

Table XI reports physical properties for PET/SMA compositions that were extrusion compounded under different conditions of temperature.

The data in Table XI demonstrate that higher barrel temperatures—e.g., Example 82—yield optimum composition HDT @ 264 psi, while increasing barrel temperatures as high as 540° F. (282° C.) rear and 550° F. (288° C.) front did not give any corresponding improvements in HDT (@ 264 psi) properties.

The data also demonstrate that approximately 10 weight percent of SMA based on the weight of the PET/SMA blend component is sufficient to obtain HDT (@ 264 psi) of at least 90° C.

EXAMPLES 92–94

Table XII reports physical properties of PET/SMA compositions injection molded at different mold temperatures.

TABLE XII
Effects of Injection Mold Temperature on Properties of PET/SMA Composition

| | EXAMPLES | | |
|---|---|---|---|
| | 92 | 93 | 94 |
| PET/SMA Ratio | | | |
| VITUF 5901, Wt. % | 70 | 70 | 70 |
| DYLARK 338S, Wt. % | 30 | 30 | 30 |
| Composition | | | |
| PET/SMA, Wt. % | 95 | 95 | 95 |
| OCF 419 AA, Wt. % | 5 | 5 | 5 |
| Sodium Stearate, phr | 1 | 1 | 1 |
| Compounding Conditions | | | |
| Barrel Temperature, (rear °F./front °F.) | 500/510 | 500/510 | 500/510 |
| Molding Conditions | | | |
| Mold Temp., °F. | 200 | 175 | 150 |
| Hold Pressure, $10^3$ psi | 5.0 | 5.0 | 5.0 |
| Properties | | | |
| Izod Impact, ¼" bar, ft.-lb/in. | 0.4 | 0.4 | 0.4 |
| Izod Impact, ⅛" bar, ft.-lb/in. | 0.4 | 0.4 | 0.4 |
| HDT @ 264 psi, °C. (first determination) | 102 | 103 | 109 |
| HDT @ 264 psi, °C. (second determination) | 104 | 98 | 100 |
| HDT @ 66 psi, °C. | 158 | 157 | 183 |

TABLE XI
Properties of PET/SMA Composition Extrusions Compounded Under Various Conditions

| | Examples | | | | | | | | | | | | |
|---|---|---|---|---|---|---|---|---|---|---|---|---|---|
| | 79 | 80 | 81 | 82 | 83 | 84 | 85 | 86 | 87 | 88 | 89 | 90 | 91 |
| PET/SMA Ratio | | | | | | | | | | | | | |
| VITUF 5901, Wt. % | 70 | 70 | 70 | 70 | 70 | 90 | 90 | 80 | 80 | 70 | 70 | 70 | 70 |
| DYLARK 338S, Wt. % | 30 | 30 | 30 | 30 | 30 | 10 | 10 | 20 | 20 | 30 | 30 | 30 | 30 |
| Composition | | | | | | | | | | | | | |
| PET/SMA, Wt. % | 95 | 95 | 95 | 95 | 95 | 95 | 95 | 95 | 95 | 95 | 95 | 95 | 95 |
| OCF 419 AA, Wt. % | 5 | 5 | 5 | 5 | 5 | — | — | — | — | — | — | — | — |
| PPG 3540, Wt. % | — | — | — | — | — | 5 | 5 | 5 | 5 | 5 | 5 | — | — |
| PPG 3541, Wt. % | — | — | — | — | — | — | — | — | — | — | — | 5 | 5 |
| Sodium Stearate, phr | 1 | 1 | 1 | 1 | 1 | 1 | 1 | 1 | 1 | 1 | 1 | 1 | 1 |
| Compounding Conditions | | | | | | | | | | | | | |
| NRM Rear Zone Temp., °F. | 490 | 500 | 500 | 500 | 510 | 540 | 500 | 540 | 500 | 540 | 500 | 500 | 500 |
| NRM Front Zone Temp., °F. | 490 | 510 | 510 | 540 | 540 | 550 | 540 | 550 | 540 | 550 | 540 | 540 | 510 |
| Molding Conditions | | | | | | | | | | | | | |
| Mold Temp., °F. | 150 | 150 | 150 | 150 | 150 | 150 | 150 | 150 | 150 | 150 | 150 | 150 | 150 |
| Screw, rpm | 70 | 70 | 70 | 70 | 70 | 90 | 70 | 80 | 70 | 70 | 70 | 70 | 70 |
| Back Pressure, psi | 25 | 25 | 25 | 25 | 25 | 0 | 0 | 0 | 0 | 25 | 0 | 25 | 25 |
| Cooling time, seconds | 35 | 35 | 35 | 35 | 35 | 35 | 45 | 35 | 45 | 35 | 45 | 45 | 45 |
| Hold Pressure, $10^3$ psi | 5.0 | 5.0 | 5.0 | 5.0 | 5.0 | 5.0 | 5.0 | 5.0 | 5.0 | 5.0 | 5.0 | 5.0 | 5.0 |
| Properties | | | | | | | | | | | | | |
| Flexural Strength, $10^3$ psi | — | — | — | — | — | 8.9 | 9.8 | 10.0 | 11.1 | 11.7 | 12.4 | 11.9 | — |
| Flexural Elastic Modulus, $10^5$ psi | — | — | — | — | — | 5.98 | 6.09 | 5.92 | 5.99 | 5.83 | 5.74 | 5.78 | — |
| Izod Impact, ¼" bar, ft.-lb/in. | 0.4 | 0.4 | 0.4 | 0.4 | 0.3 | 0.6 | 0.5 | 0.5 | 0.5 | 0.5 | 0.5 | 0.5 | 0.4 |
| Izod Impact, ⅛" bar, ft.-lb/in. | 0.4 | 0.4 | 0.4 | 0.4 | 0.3 | 0.5 | 0.4 | 0.4 | 0.3 | 0.4 | 0.3 | 0.3 | 0.3 |
| HDT @ 264 psi, °C. | 92 | 92 | 96 | 108 | 103 | 88 | 93 | 95 | 97 | 103 | 103 | 93 | 109 |
| HDT @ 264 psi, °C. (duplicate) | 94 | 100 | 98 | 104 | 106 | 87 | 91 | 100 | 108 | 105 | 108 | 102 | 105 |
| HDT @ 66 psi, °C. | 155 | — | 130 | 147 | — | — | — | — | — | — | — | — | — |

The data in Table XII demonstrate that the mold temperatures tested had no significant effect on HDT (@ 264 psi) and Izod Impact properties. It was observed that the lowest mold temperature yielded slightly better surface appearance.

EXAMPLES 95-102

Table XIII reports the effects of sodium stearate grade, glass fiber grade and injection molding conditions on HDT properties of PET/SMA compositions.

TABLE XIV

Effects of Glass Fiber and Molding Conditions on Surface Glass of PET/SMA Compositions

| Example | Composition | Mold Hold Pressure (10³ psi) | 60° Gloss (%)[a] Spruce Side | 60° Gloss (%)[a] Rear Side |
|---|---|---|---|---|
| 103 | PET/SMA (100 Wt. %) no glass fiber | 5 | 86 | 84 |
| 104 | PET/SMA (95 Wt. %) with OCF 419 AA (5%) | 5 | 60 | 51 |
| 105 | PET/SMA (95 Wt. %) with OCF 419 AA (5%) | 10 | 80 | 78 |
| 106 | PET/SMA (95 Wt. %) with OCF 731 CA (5%) | 5 | 58 | 53 |
| 107 | PET/SMA (95 Wt. %) with OCF 731 CA (5%) | 10 | 79 | 78 |
| 108 | PET/SMA (90 Wt. %) with OCF 731 CA (10%) | 5 | 30 | 30 |
| 109 | PET/SMA (90 Wt. %) with OCF 731 CA (10%) | 10 | 73 | 72 |

[a] Measured with portable Gardner Gloss Unit; measurement at central area of 2⅜″ × 4″ × ⅛″ plaque specimens

TABLE XIII

Effects Of Sodium Stearate Grade, Glass Grade, and Injection Molding Conditions on HDT Properties of PET/SMA Compositions

| | EXAMPLES | | | | | | | |
|---|---|---|---|---|---|---|---|---|
| | 95 | 96 | 97 | 98 | 99 | 100 | 101 | 102 |
| PET/SMA Ratio | | | | | | | | |
| VITUF 5901, Wt. % | 70 | 70 | 70 | 70 | 70 | 70 | 70 | 70 |
| DYLARK 338S, Wt. % | 30 | 30 | 30 | 30 | 30 | 30 | 30 | 30 |
| Composition | | | | | | | | |
| PET/SMA, Wt. % | 95 | 95 | 95 | 95 | 95 | 95 | 90 | 90 |
| OCF 419 AA, Wt. % | 5 | 5 | 5 | 5 | — | — | — | — |
| Sodium Stearate[a], phr | 1 | 1 | — | — | — | — | — | — |
| Sodium Stearate[b], phr | — | — | 1 | 1 | 1 | 1 | 1 | 1 |
| OCF 731 CA | — | — | — | — | 5 | 5 | 10 | 10 |
| Compounding Conditions | | | | | | | | |
| Barrel temperature rear °F./front °F. | 500/510 | 500/510 | 500/510 | 500/510 | 500/510 | 500/510 | 500/510 | 500/510 |
| Molding conditions | | | | | | | | |
| Mold Temp. °F. | 150 | 150 | 150 | 150 | 150 | 150 | 150 | 150 |
| Hold Pressure, 10³ psi | 5 | 10 | 5 | 10 | 5 | 10 | 5 | 10 |
| Shot Size, in. | 1.98 | 2.08 | 1.98 | 2.08 | 1.98 | 2.08 | 1.98 | 2.08 |
| Properties | | | | | | | | |
| HDT @ 264 psi, °C. | 112 | 97 | 96 | 89 | 91 | 90 | 98 | 92 |
| HDT @ 66 psi, °C. | 218 | 222 | 218 | 215 | 220 | 200 | 209 | 192 |

[a] Heat stable grade
[b] Technical grade

The data in Table XIII demonstrate that heat stable sodium stearate may yield slightly higher HDT (@ 264 psi) properties, although the advantage is relatively small.

The data also show that a hold pressure of 5,000 psi yields a higher HDT @ 264 psi than a hold pressure of 10,000 psi.

Table XIV reports the Gardner Gloss data for PET/SMA compositions. In Examples 103-109 the PET/SMA ratio in the PET/SMA compositions was 70 Wt. % VITUF 5901 and 30 Wt. % DYLARK 338. The amount of PET/SMA and the amount of glass fiber in the PET/SMA composition are given in Wt. % in parenthesis. The compositions also contained 1 part of sodium stearate per hundred parts PET.

The data in Table XIV demonstrate that PET/SMA compositions comprising 5 to 10 percent glass fiber and injection molded with 10,000 psi hold pressure have good gloss ratings. Moreover, these data demonstrate the excellent surface gloss achieved with up to 10% glass fiber loading level; and that there is very little loss of surface gloss, in comparison with PET/SMA composition without glass fiber, with up to 10% glass fiber when the hold pressure is high enough.

EXAMPLES 110-119

Table XV reports physical properties of PET/SMA compositions containing impact modifiers. For examples 110 to 119 the extruder barrel temperature (rear °F./front °F.) was 500/540 (except 500/510 and 510/540 for Examples 118 and 119, respectively), the hold pressure was 5,000 psi and the mold temperature was 150° F.

TABLE XV

Properties of PET/SMA Compositions Containing Nucleant, Glass Fiber and Impact Modifiers

| | Examples | | | | | | | | | |
|---|---|---|---|---|---|---|---|---|---|---|
| | 110 | 111 | 112 | 113 | 114 | 115 | 116 | 117 | 118 | 119 |
| PET/SMA Ratio | | | | | | | | | | |
| VITUF 5901, Wt. % | 70 | 70 | 70 | 70 | 70 | 70 | 70 | 70 | 70 | 70 |
| DYLARK 338S, Wt. % | 30 | 30 | 30 | 30 | 30 | 30 | 30 | 30 | 30 | 30 |
| Composition | | | | | | | | | | |
| PET/SMA, Wt. % | 95 | 85 | 85 | 80 | 85 | 85 | 85 | 85 | 85 | 85 |
| OCF 419 AA, Wt. % | 5 | 5 | 5 | 10 | 5 | 5 | 5 | 5 | 5 | 5 |
| Sodium Stearate, phr | 1 | 1 | — | 1 | — | — | 1 | 1 | 1 | 1 |
| Boron Nitride, phr | — | — | 1 | — | 1 | 1 | — | — | — | — |
| HYTREL 4056, Wt. % | — | 10 | 10 | 10 | — | — | — | — | 10 | 10 |
| PD0071-81, Wt. % | — | — | — | — | 10 | 5 | — | — | — | — |
| MERLON M 40, Wt. % | — | — | — | — | — | 5 | — | — | — | — |
| PETG 6763, Wt. % | — | — | — | — | — | — | 10 | — | — | — |
| KODAR A150, Wt. % | — | — | — | — | — | — | — | 10 | — | — |
| Properties | | | | | | | | | | |
| Izod Impact, $\frac{1}{4}"$ bar, ft.-lb/in. | 0.5 | 0.9 | 1.0 | 1.0 | 0.7 | 0.7 | 0.5 | 0.5 | 0.9 | 0.7 |
| Izod Impact, $\frac{1}{8}"$ bar, ft.-lb/in. | 0.4 | 0.7 | 0.9 | 0.8 | 0.7 | 0.8 | 0.4 | 0.5 | 0.7 | 0.6 |
| HDT @ 264 psi, °C. | 100 | 86 | 80 | 107 | 84 | 91 | 84 | 98 | 91[a] | 91[b] |
| HDT @ 66 psi, °C. | 142 | 140 | 134 | 188 | 174 | 111 | 165 | 140 | — | — |

[a] Duplicate measurement yielded 93° C.
[b] Duplicate measurement yielded 95° C.

The majority of the data in Table XV demonstrate that the incorporation of impact modifiers resulted in blends having HDT values (@ 264 psi) greater than 80° C. and improved Izod Impact. Furthermore, good HDT @ 66 psi was obtained with HYTREL 4056.

EXAMPLES 120-125

Table XVI reports the HDT properties of PET/SMA compositions and PET compositions. The tests were done in triplicate, thus Examples 120 and 121 form one group of tests; Examples 122 and 123 form another group of tests; and Examples 124 and 125 form still another group of tests. A different batch compound was used for each run. The extruder barrel temperature (rear °F./front °F.) was 500/540, the hold pressure was 5,000 psi and the mold temperature was 150° F.

TABLE XVI

Composition of HDT Properties of PET/SMA Compositions With PET Compositions

| | EXAMPLES | | | | | |
|---|---|---|---|---|---|---|
| | 120 | 121 | 122 | 123 | 124 | 125 |
| PET/SMA Ratio | | | | | | |
| VITUF 5901, Wt. % | 70 | — | 70 | — | 70 | — |
| DYLARK 338S, Wt. % | 30 | — | 30 | — | 30 | — |
| Composition | | | | | | |
| PET/SMA, Wt. % | 95 | — | 95 | — | 95 | — |
| OCF 419 AA, Wt. % | 5 | — | 5 | — | 5 | — |
| Sodium Stearate, phr | 1 | — | 1 | — | 1 | — |
| PET Composition | | | | | | |
| VITUF 5901, Wt. % | — | 95 | — | 95 | — | 95 |
| OCF 419 AA, Wt. % | — | 5 | — | 5 | — | 5 |
| Sodium Stearate, phr | — | 1 | — | 1 | — | 1 |
| Properties | | | | | | |
| HDT @ 264 psi, °C. | 105 | 85 | 93 | 86 | 87* | 84 |
| HDT @ 66 psi, °C. | 221 | 249 | — | — | 223 | 243 |

*This HDT value is suspiciously low.

The data in Table XVI demonstrate that the HDT for the PET/SMA compositions @ 264 psi is higher than for the PET compositions. Observation showed that the PET/SMA compositions gave better surface appearance on injection molded parts. Specifically, use of 10,000 psi hold pressure gave surfaces virtually free of glass marks for the PET/SMA compositions, while the PET compositions yielded parts with numerous glass marks. The conclusion is that glass-reinforced, nucleated PET/SMA compositions are superior to glass-reinforced, nucleated PET compositions in surface appearance and HDT (@ 264 psi) properties.

Tables XVII-XXII report the physical properties of diffferent nucleating agents in PET/SMA compositions in comparison with sodium stearate. The extruder barrel temperature (rear °F./front °F.) for Examples 126-128 was 510/540, for Examples 129-147 it was 500/540. For examples 126-147 the mold temperature was 150 ° F. and the hold pressure was 5,000 psi.

TABLE XVII

Effects of Different Nucleating Agents in PET/SMA Compositions

| | EXAMPLES | | |
|---|---|---|---|
| | 126 | 127 | 128 |
| PET/SMA Ratio | | | |
| VITUF 5901, Wt. % | 70 | 70 | 70 |
| DYLARK 338S, Wt. % | 30 | 30 | 30 |
| Composition | | | |
| PET/SMA, Wt. % | 95 | 95 | 95 |
| PPG 3540, Wt. % | 5 | 5 | 5 |
| Sodium Stearate, phr | 1 | — | — |
| Sodium Montanate, phr | — | 1 | — |
| Potassium Stearate, phr | — | — | 1 |
| Properties | | | |
| Flexural Strength, $10^3$ psi | 12.7 | 13.5 | 12.3 |
| Flexural Modulus, $10^5$ psi | 5.66 | 5.38 | 5.62 |
| Izod Impact, $\frac{1}{4}"$ bar, ft.-lb/in. | 0.60 | 0.40 | 0.60 |
| Izod Impact, $\frac{1}{8}"$ bar, ft.-lb/in. | 0.50 | 0.40 | 0.50 |
| HDT @ 264 psi, °C. | 110 | 89 | 101 |
| HDT @ 264 psi, °C. (duplicate) | 101.6 | 87 | 101 |

TABLE XVIII

Effects of Different Nucleating Agents in PET/SMA Compositions

| | EXAMPLES | | | |
|---|---|---|---|---|
| | 129 | 130 | 131 | 132 |
| PET/SMA Ratio | | | | |
| VITUF 5901, Wt. % | 70 | 70 | 70 | 70 |
| DYLARK 338S, Wt. % | 30 | 30 | 30 | 30 |

TABLE XVIII-continued
Effects of Different Nucleating Agents in PET/SMA Compositions

| | \multicolumn{4}{c}{EXAMPLES} | | | |
|---|---|---|---|---|
| | 129 | 130 | 131 | 132 |
| Composition | | | | |
| PET/SMA, Wt. % | 95 | 95 | 95 | 95 |
| PPG 3540, Wt. % | 5 | 5 | 5 | 5 |
| Sodium Stearate, phr | 1 | — | — | — |
| Ivory Snow, phr | — | 1 | — | — |
| Sodium Benzoate, phr | — | — | 1 | — |
| SURLYN 8940, phr | — | — | — | 1 |
| Properties | | | | |
| Flexural Strength, $10^3$ psi | 12.6 | 11.8 | 12.9 | 14.1 |
| Flexural Modulus, $10^5$ psi | 5.70 | 5.65 | 5.64 | 5.40 |
| Izod Impact, ¼" bar, ft.-lb/in. | 0.40 | 0.40 | 0.50 | 0.40 |
| Izod Impact, ⅛" bar, ft.-lb/in. | 0.30 | 0.40 | 0.40 | 0.40 |
| HDT @ 264 psi, °C. | 102 | 98.8 | 97 | 93.8 |
| HDT @ 264 psi, °C. (duplicate) | 93 | 95 | 97 | 96 |

TABLE XIX
Effects of Different Nucleating Agents in PET/SMA Compositions

| | EXAMPLES | | |
|---|---|---|---|
| | 133 | 134 | 135 |
| PET/SMA Ratio | | | |
| VITUF 5901, Wt. % | 70 | 70 | 70 |
| DYLARK 338S, Wt. % | 30 | 30 | 30 |
| Composition | | | |
| PET/SMA, Wt. % | 95 | 95 | 95 |
| PPG 3540, Wt. % | 5 | 5 | 5 |
| Sodium Stearate, phr | 1 | — | — |
| MICROTALC CP-10-40, phr | — | 1 | — |
| SURLYN 8020, phr | 5.0 | 5.0 | 5.0 |
| Properties | | | |
| Flexural Strength, $10^3$ psi | 12.9 | 14.0 | 13.9 |
| Flexural Modulus, $10^5$ psi | 5.66 | 5.52 | 5.38 |
| Izod Impact, ¼" bar, ft.-lb/in. | 0.50 | 0.40 | 0.40 |
| Izod Impact, ⅛" bar, ft.-lb/in. | 0.30 | 0.40 | 0.40 |
| HDT @ 264 psi, °C. | 96 | 90 | 96 |
| HDT @ 264 psi, °C. (duplicate) | 87 | 91 | 97 |

TABLE XX
Effects of Different Nucleating Agents in PET/SMA Compositions

| | EXAMPLES | | |
|---|---|---|---|
| | 136 | 137 | 138 |
| PET/SMA Ratio | | | |
| VITUF 5901, Wt. % | 70 | 70 | 70 |
| DYLARK 338S, Wt. % | 30 | 30 | 30 |
| Composition | | | |
| PET/SMA, Wt. % | 95 | 95 | 95 |
| PPG 3540, Wt. % | 5 | 5 | 5 |
| Sodium Stearate, phr | 1 | — | — |
| SURLYN 8528, phr | — | 1 | — |
| Sodium Propionate, phr | — | — | 1 |
| Properties | | | |
| Flexural Strength, $10^3$ psi | 12.7 | 14.4 | 9.99 |
| Flexural Modulus, $10^5$ psi | 5.56 | 5.34 | 5.79 |
| Izod Impact, ¼" bar, ft.-lb/in. | 0.40 | 0.50 | 0.50 |
| Izod Impact, ⅛" bar, ft.-lb/in. | 0.40 | 0.40 | 0.40 |
| HDT @ 264 psi, °C. | 89.2 | 90 | 116 |
| HDT @ 264 psi, °C. (duplicate) | 106 | 91 | 117 |

TABLE XXI
Effects of Different Nucleating Agents in PET/SMA Compositions

| | EXAMPLES | | | |
|---|---|---|---|---|
| | 139 | 140 | 141 | 142 |
| PET/SMA Ratio | | | | |
| VITUF 5901, Wt. % | 70 | 70 | 70 | 70 |
| DYLARK 378, Wt. % | 30 | 30 | 30 | 30 |
| Composition | | | | |
| PET/SMA, Wt. % | 95 | 95 | 95 | 95 |
| PPG 3540, Wt. % | 5 | 5 | 5 | 5 |
| Sodium Stearate, phr | 1 | — | — | — |
| Sodium Propionate, phr | — | 1 | — | — |
| Sodium Acetate, phr | — | — | 1 | — |
| Sodium Carbonate, phr | — | — | — | 1 |
| Properties | | | | |
| Flexural Strength, $10^3$ psi | 13.8 | 10.9 | 14.7 | 15.0 |
| Flexural Modulus, $10^5$ psi | 5.11 | 5.18 | 5.11 | 5.14 |
| Izod Impact, ¼" bar, ft.-lb/in. | 0.7 | 0.5 | 0.7 | 0.7 |
| Izod Impact, ⅛" bar, ft.-lb/in. | 0.6 | 0.5 | 0.6 | 0.6 |
| HDT @ 264 psi, °C. | 94 | 116 | 95 | 96 |
| HDT @ 264 psi, °C. (duplicate) | 102 | 115 | 94 | 99 |

TABLE XXII
Effects of Different Nucleating Agents in PET/SMA Compositions

| | EXAMPLES | | | | |
|---|---|---|---|---|---|
| | 143 | 144 | 145 | 146 | 147 |
| PET/SMA Ratio | | | | | |
| VITUF 5901, Wt. % | 70 | 70 | 70 | 70 | 70 |
| DYLARK 378, Wt. % | 30 | 30 | 30 | 30 | 30 |
| Composition | | | | | |
| PET/SMA, Wt. % | 95 | 95 | 95 | 95 | 95 |
| PPG 3540, Wt. % | 5 | 5 | 5 | 5 | 5 |
| Sodium Stearate, phr | 1 | — | — | — | — |
| Sodium Propionate, phr | — | 1 | — | — | — |
| Sodium n-butyrate*, phr | — | — | — | — | — |
| Sodium Caprylate, phr | — | — | — | 1 | — |
| Sodium Myristate, phr | — | — | — | — | 1 |
| Properties | | | | | |
| Flexural Strength, $10^3$ psi | 14.2 | 13.1 | 12.6 | 14.3 | 14.5 |
| Flexural Modulus, $10^5$ psi | 4.91 | 5.07 | 5.41 | 5.36 | 5.36 |
| Izod Impact, ¼" bar, ft.-lb/in. | 0.8 | 0.6 | 0.6 | 0.6 | 0.7 |
| Izod Impact, ⅛" bar, ft.-lb/in. | 0.6 | 0.5 | 0.5 | 0.6 | 0.6 |
| HDT @ 264 psi, °C. | 91 | 102 | 106 | 98 | 95 |
| HDT @ 264 psi, °C. (duplicate) | 93 | 105 | 111 | 108 | 95 |

*Large amounts of irritating fumes were generated during compounding, but the molding parts retained only a faint trace of odor.

Surface appearance with sodium caprylate and sodium myristate is at least as good as with sodium stearate, but with sodium propionate and sodium n-butyrate the parts are not as glossy as with sodium stearate.

Tables XVII–XXII demonstrate the good physical properties obtained with different nucleating agents in compositions of this invention.

EXAMPLES 148–153

Table XXIII reports physical properties for compositions of this invention in which the nucleating agent level was varied. The mold temperature was 150° F., the extruder barrel temperature (rear °F./front °F.) was 500/540 and the hold pressure was 5,000 psi.

TABLE XXIII

Effects of Varying Nucleating Agent Level In PET/SMA Compositions

| | EXAMPLES | | | | | |
|---|---|---|---|---|---|---|
| | 148 | 149 | 150 | 151 | 152 | 153 |
| PET/SMA Ratio | | | | | | |
| VITUF 5901, Wt. % | 70 | 70 | 70 | 70 | 70 | 70 |
| DYLARK 378, Wt. % | 30 | 30 | 30 | 30 | 30 | 30 |
| Composition | | | | | | |
| PET/SMA, Wt. % | 95 | 95 | 95 | 95 | 95 | 95 |
| PPG 3540, Wt. % | 5 | 5 | 5 | 5 | 5 | 5 |
| Sodium Stearate, phr | 0.5 | 1.0 | 1.5 | — | — | — |
| Sodium Propionate, phr | — | — | — | 0.5 | 1.0 | 1.5 |
| Properties | | | | | | |
| Flexural Strength, $10^3$ psi | 14.2 | 14.6 | 14.5 | 14.7 | 11.3 | 7.9 |
| Flexural Modulus, $10^5$ psi | 4.91 | 5.07 | 5.10 | 5.25 | 5.37 | 5.17 |
| Izod Impact, ¼" bar, ft.-lb/in. | 0.8 | 0.8 | 0.8 | 0.6 | 0.5 | 0.5 |
| Izod Impact, ⅛" bar, ft.-lb/in. | 0.6 | 0.6 | 0.6 | 0.5 | 0.5 | 0.4 |
| HDT @ 264 psi, °C. | 91 | 91 | 98 | 112 | 122 | 124 |
| HDT @ 264 psi, °C. (duplicate) | 93 | 102 | 95 | 114 | 116 | 114 |

TABLE XXIV

Effects of Different Levels of Glass Fibers In PET/SMA Compositions

| | EXAMPLES | | | | | |
|---|---|---|---|---|---|---|
| | 154 | 155 | 156 | 157 | 158 | 159 |
| PET/SMA Ratio | | | | | | |
| VITUF 5901, Wt. % | 70 | 70 | 70 | 70 | 70 | 70 |
| DYLARK 378, Wt. % | 30 | 30 | 30 | 30 | 30 | 30 |
| Composition | | | | | | |
| PET/SMA, Wt. % | 95 | 93 | 90 | 95 | 93 | 90 |
| PPG 3540, Wt. % | 5 | 7 | 10 | 5 | 7 | 10 |
| Sodium Stearate, phr | 1.0 | 1.0 | 1.0 | — | — | — |
| Sodium Propionate, phr | — | — | — | 1.0 | 1.0 | 1.0 |
| Properties | | | | | | |
| Flexural Strength, $10^3$ psi | 9.95 | 11.1 | 13.3 | 14.3 | 15.3 | 16.8 |
| Flexural Modulus, $10^5$ psi | 5.20 | 5.96 | 6.73 | 5.12 | 8.25 | 6.71 |
| Izod Impact, ¼" bar, ft.-lb/in. | 0.6 | 0.8 | 1.1 | 0.8 | 0.9 | 1.3 |
| Izod Impact, ⅛" bar, ft.-lb/in. | 0.4 | 0.6 | 0.8 | 0.7 | 0.9 | 1.1 |
| HDT @ 264 psi, °C. | 114 | 127 | 130 | 103 | 114 | 131 |
| HDT @ 264 psi, °C. (duplicate) | 110 | 125 | 131 | 97 | 115 | 130 |

The data in Table XXIII show that a preferred nucleating agent range is 0.5 to 1.0 phr. When the level of sodium stearate is increased from 0.5 to 1.5 phr there is a relatively small increase in HDT @ 264 psi. Further, when the level of sodium propionate is decreased from 1.5 to 0.5 phr the flexural strength and Izod Impact approach the values routinely obtainable with 1.0 phr sodium stearate while maintaining a 10° C. or larger advantage in HDT @ 264 psi.

EXAMPLES 154–159

Table XXIV reports physical properties of compositions of the invention in which the nucleating agent was either sodium stearate or sodium propionate and in which the level of glass fibers was varied. The mold temperature, barrel extruder temperature and hold pressure were the same as for Examples 148–153.

The data in Table XXIV demonstrate the good physical properties with various levels of glass fibers in the compositions of this invention.

In the above experiments some parts were molded at 10,000 psi hold pressures and the surfaces inspected. The compositions containing sodium stearate retained good gloss as the glass loading increased to 10% with a small increase in the amount of glass marks. The surfaces of the alloys containing sodium propionate were substantially less glossy and deteriorated as the glass concentration was increased.

EXAMPLES 160–167

Table XXV reports the physical properties of composition of this invention containing processed mineral fiber (Jim Walter Resources PMF 604) milled glass fibers (OCF 739 BA) or PPG 3540. As indicated in Table XXV, in some of the examples the glass fiber was treated with 1 phr (parts per hundred parts glass fiber) Union Carbide A187 epoxy silane. The mold temperature, barrel extruder temperature and hold pressure were the same as for Examples 148–153.

TABLE XXV

Effects of Different Fiber Modifiers On PET/SMA Compositions

| | EXAMPLES | | | | | | | |
|---|---|---|---|---|---|---|---|---|
| | 160 | 161 | 162 | 163 | 164 | 165 | 166 | 167 |
| PET/SMA Ratio | | | | | | | | |
| VITUF 5901, Wt. % | 70 | 70 | 70 | 70 | 70 | 70 | 70 | 70 |
| DYLARK 378, Wt. % | 30 | 30 | 30 | 30 | 30 | 30 | 30 | 30 |
| Composition | | | | | | | | |
| PET/SMA, Wt. % | 95 | 90 | 95 | 90 | 95 | 95 | 95 | 90 |
| PPG 3540, Wt. % | 5 | 10 | — | — | 5 | — | — | — |
| PMF 604, Wt. % | — | — | 5 | 10 | — | — | — | — |
| OCF 739 BA, Wt. % | — | — | — | — | — | 5 | 5 | 10 |
| A187, epoxy silane, phr* | — | — | 1 | 1 | — | — | 1 | 1 |
| Sodium Stearate, phr | 1 | 1 | 1 | 1 | 1 | 1 | 1 | 1 |
| Properties | | | | | | | | |
| Flexural Strength, $10^3$ psi | 14.1 | 17.1 | 10.3 | 10.6 | 14.5 | 10.4 | 9.74 | 9.95 |
| Flexural Modulus, $10^5$ psi | 4.63 | 6.65 | 4.24 | 5.14 | 5.30 | 4.20 | 4.27 | 4.32 |
| Izod Impact, ¼" bar, ft.-lb/in. | 0.8 | 1.2 | 0.5 | 0.4 | 0.8 | 0.3 | 0.3 | 0.4 |
| Izod Impact, ⅛" bar, | 0.7 | 1.2 | 0.4 | 0.3 | 0.6 | 0.3 | 0.3 | 0.5 |

TABLE XXV-continued
Effects of Different Fiber Modifiers On PET/SMA Compositions

| | EXAMPLES | | | | | | | |
|---|---|---|---|---|---|---|---|---|
| | 160 | 161 | 162 | 163 | 164 | 165 | 166 | 167 |
| ft.-lb/in. | | | | | | | | |
| HDT @ 264 psi, °C. | 95 | 132 | 85 | 93 | 94 | 79 | 79 | 85 |
| HDT @ 264 psi, °C. (duplicate) | 96 | 139 | 87 | 90 | 97 | 79 | 79 | 86 |

*Parts per hundred parts glass fiber.

The data in Table XXV demonstrate the good physical properties obtained with the various fiber modifiers. Examples 160-167 show that PPG 3540 is a preferred modifier. Thus, at the 5% loading level with PPG 3540, the physical properties obtained showed more improvement than with a 10% loading of PM 604 or OCF 739 BA and the surface of the molded article was more desirable with the PPG 3540. Example 165, OCF 739 BA without A 187, showed a glossier surface than Example 166, OCF 739 BA with A 187.

EXAMPLES 168-170

Table XXVI reports physical properties of blends of this invention containing various amounts of sodium propionate as the nucleating agent. The mold temperature, barrel extruder temperature and hold pressure were the same as for Examples 148-153.

TABLE XXVI
Effects of Various Sodium Propionate Levels On PET/SMA Compositions

| | EXAMPLES | | |
|---|---|---|---|
| | 168 | 169 | 170 |
| PET/SMA Ratio | | | |
| VITUF 5901, Wt. % | 70 | 70 | 70 |
| DYLARK 378, Wt. % | 30 | 30 | 30 |
| Composition | | | |
| PET/SMA, Wt. % | 95 | 95 | 95 |
| PPG 3540, Wt. % | 5 | 5 | 5 |
| Sodium Propionate, phr | 0.1 | 0.3 | 0.5 |
| Properties | | | |
| Flexural Strength, $10^3$ psi | 15.0 | 14.1 | 13.3 |
| Flexural Modulus, $10^5$ psi | 5.13 | 4.90 | 5.14 |
| Izod Impact, ¼" bar, ft.-lb/in. | 0.7 | 0.6 | 0.6 |
| Izod Impact, ⅛" bar, ft.-lb/in. | 0.7 | 0.7 | 0.5 |
| HDT @ 264 psi, °C. | 88 | 101 | 108 |
| HDT @ 264 psi, °C. (duplicate) | 94 | 104 | 110 |

The data in Table XXVI demonstrate that sodium propionate is effective at a concentration as low as about 0.1 phr in the compositions of this invention.

EXAMPLES 171-174

Table XXVII reports physical properties of PET/SMA compositions having various glass fiber loading levels. The mold temperature, barrel extruder temperature and hold pressure are the same as for Examples 148-153.

TABLE XXVII
Effect of Glass Fiber Loading Level on PET/SMA Compositions

| | EXAMPLES | | | |
|---|---|---|---|---|
| | 171 | 172 | 173 | 174 |
| PET/SMA Ratio | | | | |
| VITUF 5901, Wt. % | 70 | 70 | 70 | 70 |
| DYLARK 378, Wt. % | 30 | 30 | 30 | 30 |
| Composition | | | | |
| PET/SMA, Wt. % | 95 | 85 | 80 | 70 |
| PPG 3540, Wt. % | 5 | 15 | 20 | 30 |
| Sodium Stearate, phr | 1 | 1 | 1 | 1 |
| Properties | | | | |
| Flexural Strength, $10^3$ psi | 14.1 | 19.6 | 20.3 | 19.6 |
| Flexural Modulus, $10^5$ psi | 5.12 | 7.94 | 8.59 | 10.4 |
| Izod Impact, ¼" bar, ft.-lb/in. | 0.7 | 1.3 | 1.4 | 1.5 |
| Izod Impact, ⅛" bar, ft.-lb/in. | 0.6 | 1.4 | 1.6 | 1.8 |
| HDT @ 264 psi, °C. | 94 | 138 | 137 | 127 |
| HDT @ 264 psi, °C. (duplicate) | 93 | 143 | 130 | 129 |

The data in Table XXVII demonstrate the good physical properties obtained with the various loading levels of glass fibers. Visual inspection of plaques injection molded at 10,000 psi hold pressure showed that excellent surface appearance was maintained with these compositions up to a 15% glass fiber loading level.

EXAMPLES 175-178

Table XXVIII reports physical properties of a PET/SMA composition with a different glass fiber (PPG 3540M) in comparison with previously available glass fibers (PPG 3540, OCF 419 AA and OCF 885 EB). PPG 3540M is reportedly a new version of PPG 3540. The compositions were compounded on a vacuum vented 1¼" Killion extruder at a vacuum level of about 25 inches of Hg (21-28 range) with zone temperatures (rear °F./middle °F./front °F.) of 525/525/525, a melt temperature of about 530° F. (526-531 range), a feeder speed of 12 ppm, a machine residence time of 35 seconds, a screw speed of 100 ppm and a die temperature of 550° F. The mold temperature was 150° F. and the hold pressure was 5,000 psi.

TABLE XXVIII
Comparison of The Effect of Different Glass Fibers on PET/SMA Compositions

| | EXAMPLES | | | |
|---|---|---|---|---|
| | 175 | 176 | 177 | 178 |
| PET/SMA Ratio | | | | |
| VITUF 5901, Wt. % | 85 | 85 | 85 | 85 |
| DYLARK 378, Wt. % | 15 | 15 | 15 | 15 |
| Composition | | | | |
| PET/SMA, Wt. % | 95 | 95 | 95 | 95 |
| PPG 3540, Wt. % | 5 | — | — | — |
| PPG 3540M, Wt. % | — | 5 | — | — |
| OCF 419, Wt. % | — | — | 5 | — |
| OCF 885, Wt. % | — | — | — | 5 |
| Sodium Stearate, phr | 1 | 1 | 1 | 1 |
| Properties | | | | |
| Flexural Strength, $10^3$ psi | 16.3 | 17.1 | 14.1 | 14.4 |
| Flexural Modulus, $10^5$ psi | 5.56 | 5.62 | 6.64 | 5.65 |
| Izod Impact, ¼" bar, ft.-lb/in. | 0.7 | 0.7 | 0.7 | 0.8 |

TABLE XXVIII-continued
Comparison of The Effect of Different Glass Fibers on PET/SMA Compositions

| | EXAMPLES | | | |
|---|---|---|---|---|
| | 175 | 176 | 177 | 178 |
| Izod Impact, ⅛" bar, ft.-lb/in. | 0.6 | 0.6 | 0.6 | 0.6 |
| HDT @ 264 psi, °C. | 94 | 102 | 100 | 94 |
| HDT @ 264 psi, °C. (duplicate) | 101 | 106 | 96 | 94 |

The data in Table XXVIII demonstrate that PPG 3540M is as effective as PPG 3540.

EXAMPLES 179–184

Table XXIX reports physical properties of PET/SMA compositions that were compounded at various temperatures using a vacuum-vented 1¼" Killion extruder. The screw speed was 100 rpm, the feeder speed was 11–12 rpm, the melt temperature was 529°–531° F. (Examples 181 and 182), 506°–509° F. (Examples 179 and 180) and 545°–550° F. (Examples 183 and 184), the vacuum pressure was 24–28 inches Hg and the machine residence time was about 37 seconds (Examples 181–184) and about 34 seconds (Examples 179–181). The mold temperature was 150° F.

TABLE XXIX
Effects of Melt Compounding Conditions On PET/SMA Compositions

| | EXAMPLES | | | | | |
|---|---|---|---|---|---|---|
| | 179 | 180 | 181 | 182 | 183 | 184 |
| PET/SMA Ratio | | | | | | |
| VITUF 5901, Wt. % | 85 | 85 | 85 | 85 | 85 | 85 |
| DYLARK 378, Wt. % | 15 | 15 | 15 | 15 | 15 | 15 |
| Composition | | | | | | |
| PET/SMA, Wt. % | 95 | 95 | 95 | 95 | 95 | 95 |
| PPG 3540, Wt. % | 5 | 5 | 5 | 5 | 5 | 5 |
| Sodium Stearate, phr | 1 | 1 | 1 | 1 | 1 | 1 |
| Compounding Conditions | | | | | | |
| Zone Temperatures, °F.* | 490 | 490 | 525 | 525 | 550 | 550 |
| Die Temperature | 510 | 510 | 525 | 525 | 550 | 550 |
| Molding Conditions | | | | | | |
| Hold Pressure, 10³ psi | 5 | 10 | 5 | 10 | 5 | 10 |
| Properties | | | | | | |
| Flexural Strength, 10³ psi | 15.9 | 15.1 | 16.4 | 17.3 | 15.1 | 15.3 |
| Flexural Modulus, 10⁵ psi | 5.57 | 5.60 | 5.53 | 5.73 | 5.62 | 5.64 |
| Izod Impact, ¼" bar, ft.-lb/in. | 0.6 | 0.6 | 0.7 | 0.6 | 0.7 | 0.7 |
| Izod Impact, ⅛" bar, ft.-lb/in. | 0.6 | 0.6 | 0.6 | 0.6 | 0.6 | 0.7 |
| HDT @ 264 psi, °C. | 100 | 100 | 93 | 102 | 112 | 101 |
| HDT @ 264 psi, °C. (duplicate) | 111 | 107 | 110 | 102 | 113 | 106 |

*Rear °F./middle °F./front °F.

The data in Table XXIX show the good physical results obtained under the various compounding conditions with excellent plaque surfaces at 10,000 psi hold pressure.

EXAMPLES 185–192

Table XXX reports physical properties for PET/SMA compositions compounded on a vacuum-vented 1¼" Killion Extruder at a vacuum level of about 15 to about 20 inches of mercury. The mold temperature was 150° F.

TABLE XXX
Effects of Vacuum-Vented Compounding Conditions On PET/SMA Compositions

| | EXAMPLES | | | | | | | |
|---|---|---|---|---|---|---|---|---|
| | 185 | 186 | 187 | 188 | 189 | 190 | 191 | 192 |
| PET/SMA Ratio | | | | | | | | |
| VITUF 5901, Wt. % | 70 | 70 | 70 | 70 | 70 | 70 | 70 | 70 |
| DYLARK 378, Wt. % | 30 | 30 | 30 | 30 | 30 | 30 | 30 | 30 |
| Composition | | | | | | | | |
| PET/SMA, Wt. % | 95 | 95 | 95 | 95 | 95 | 95 | 95 | 95 |
| PPG 3540, Wt. % | 5 | 5 | 5 | 5 | 5 | 5 | 5 | 5 |
| Sodium Stearate, phr | 1 | 1 | 1 | 1 | 1 | 1 | 1 | 1 |
| Extrusion Conditions* | | | | | | | | |
| Screw Speed, rpm | 70 | 70 | 80 | 80 | 120 | 120 | 120 | 120 |
| Feeder speed, rpm | 8 | 8 | 11 | 11 | 11 | 11 | 18 | 18 |
| Melt temperature, °F. | 520–523 | 520–523 | 525–528 | 525–528 | 532–534 | 532–534 | 530–533 | 530–533 |
| Machine Residence Time, Seconds | 60 | 60 | 50 | 50 | 35 | 35 | 28 | 28 |
| Molding Conditions | | | | | | | | |
| Hold Pressure 10³ psi | 5 | 10 | 5 | 10 | 5 | 10 | 5 | 10 |
| Screw Recovery Time, Seconds | 11–12 | 11–12 | 11–12 | 11–12 | 15–16 | 15–16 | 14–15 | 14–15 |
| Properties | | | | | | | | |
| Flexural Strength, 10³ psi | 15.1 | 15.5 | 15.2 | 15.4 | 15.5 | 15.1 | 15.2 | 15.4 |
| Flexural Modulus, 10⁵ psi | 5.12 | 5.33 | 5.03 | 5.17 | 5.08 | 5.16 | 4.99 | 5.05 |
| Izod Impact, ¼" bar, ft.-lb/in. | 0.7 | 0.7 | 0.7 | 0.6 | 0.7 | 0.6 | 0.7 | 0.6 |
| Izod Impact, ⅛" bar, ft.-lb/in. | 0.7 | 0.7 | 0.6 | 0.6 | 0.6 | 0.6 | 0.6 | 0.6 |
| HDT @ 264 psi, °C. | 95 | 94 | 98 | 94 | 96 | 99 | 98 | 99 |
| HDT @ 264 psi, °C. | 95 | 92 | 94 | 96 | 104 | 104 | 89 | 95 |
| HDT @ 264 psi, °C. | 91 | 96 | — | — | — | — | — | — |
| HDT @ 264 psi, °C. | 98 | 98 | — | — | — | — | — | — |

*Zone/Die Temperatures were 525° F. on all compounding runs.

The data in Table XXX demonstrate the good physical properties obtained with various compounding conditions. The vacuum-venting resulted in solid pellets which yielded rapid and consistent screw recovery times when injection molded.

EXAMPLES 163-196

Table XXXI reports physical properties of another series of tests utilizing recycle PET in the composition of this invention. The mold temperature, barrel extruder temperature and hold pressure were the same as for Examples 148-153.

TABLE XXXI

Use of Recycle PET In PET/SMA Compositions

| | EXAMPLES | | | |
|---|---|---|---|---|
| | 193 | 194 | 195 | 196 |
| PET/SMA Ratio | | | | |
| VITUF 5901, Wt. % | 70 | — | 70 | — |
| Pure Tech PET, Wt. % | — | 70 | — | 70 |
| DYLARK 338S, Wt. % | 30 | 30 | 30 | 30 |
| Composition | | | | |
| PET/SMA, Wt. % | 100 | 100 | 95 | 95 |
| OCF 419 AA, Wt. % | — | — | 5.0 | 5.0 |
| Sodium Stearate*, phr | — | — | 1.0 | 1.0 |
| Properties | | | | |
| Izod Impact, ¼″ bar, ft.-lb/in. | 0.5 | 0.5 | 0.5 | 0.5 |
| Izod Impact, ⅛″ bar, ft.-lb/in. | 0.5 | 0.4 | 0.4 | 0.4 |
| HDT @ 264 psi, °C. | 84 | 79 | 106 | 96 |
| HDT @ 264 psi, °C. (duplicate) | 82 | 80 | 110 | 102 |
| HDT @ 66 psi, °C. | 102 | 108 | 127 | 133 |

*Witco heat-stable grade.

What is claimed is:

1. A thermoplastic composition which comprises in intimate admixture:
    (a) a polyethylene terephthalate, and
    (b) a copolymer of a vinyl aromatic compound and an α,β-unsaturated cyclic anhydride, said copolymer being a rubber-modified graft copolymer or a rubber-free copolymer,
    (c) a fibrous modifier, and
    (d) a nucleating agent.

2. A composition of claim 1 having a heat deflection temperature of at least about 80° C. at 264 psi as measured by the ASTM procedure D 648-72.

3. A composition of claim 1 wherein said copolymer of (b) is a rubber modified graft copolymer of a styrene and maleic anhydride.

4. A composition of claim 1 wherein said copolymer of (b) is a rubber modified graft copolymer of styrene and maleic anhydride.

5. A composition of claim 1 wherein said copolymer of (b) is a rubber-free copolymer of a styrene and maleic anhydride.

6. A composition of claim 1 wherein said copolymer of (b) is a rubber-free copolymer comprising from about 5 to about 35 percent by weight of said cyclic anhydride and from about 95 to about 65 percent by weight of said vinyl aromatic compound.

7. A composition of claim 1 wherein said copolymer of (b) is a rubber-modified graft copolymer comprising from about 5 to about 35 percent by weight of said cyclic anhydride, and about 95 to about 65 percent by weight of said vinyl aromatic compound in the resin phase and from about 4 to about 30 percent by weight of rubber in the total graft polymer.

8. A composition of claim 1 wherein (a) is present within the range of from about 10 to about 90 percent by weight based on the weight of (a) plus (b), (b) is present within the range of from about 90 to about 10 percent by weight based on the weight of (a) plus (b), wherein (c) is present within the range of from about 1 to about 10 percent by weight based on the weight of (a) plus (b) plus (c) and wherein (d) is present within the range of from about 0.1 to about 5 parts per 100 parts of (a).

9. A composition of claim 1 wherein (c) is glass fibers, present within the range of from about 1 to about 10 percent by weight based on the weight of (a) plus (b) plus (c).

10. A composition of claim 1 wherein said nucleating agent is an alkali metal salt of an aliphatic or aromatic monocarboxylic acid, an ionomer resin (sodium salt), boron nitride, a mixture of the sodium salts of tallow fatty acids and coconut fatty acids, talc or sodium carbonate.

11. A composition of claim 10 wherein said salt is sodium stearate, sodium 2-chloro-4-nitrobenzoate, sodium montanate, potassium stearate, sodium propionate, sodium acetate, sodium n-butyrate, sodium caprylate or sodium myristate.

12. A composition of claim 10 wherein said ionomer resin (sodium salt) has a melt flow index of from about 1.0 to about 2.8 g/10 min. as measured by ASTM procedure D 1236.

13. A composition of claim 1 wherein said nucleating agent is a sodium salt of an aliphatic or aromatic monocarboxylic acid.

14. A composition of claim 1 wherein (a) is present within the range of from about 10 to about 90 percent by weight based on the weight of (a) plus (b), (b) is present within the range of from about 90 to about 10 percent by weight based on the weight of (a) plus (b), wherein (c) is present within the range of from about 1 to about 10 percent by weight based on the weight of (a) plus (b) plus (c) and wherein (d) is present within the range of from about 0.1 to about 5 parts per 100 parts of (a) and wherein said nucleating agent is an alkali metal salt of an aliphatic or aromatic monocarboxylic acid, an ionomer resin (sodium salt), boron nitride, a mixture of the sodium salts of tallow fatty acids and coconut fatty acids, talc or sodium carbonate.

15. A composition of claim 1 wherein said polyethylene terephthalate has an intrinsic viscosity of between about 0.5 and 1.2 as measured at 25° using a solvent consisting of 60 percent by weight phenol and 40 percent by weight of tetrachloroethane.

16. A composition of claim 1 further containing a copolyetherester segmented block copolymer impact modifier.

17. A composition of claim 16 wherein said copolyetherester segmented block copolymer has approximately 50 mole percent polyether segments.

18. A thermoplastic composition which comprises in intimate admixture:
    (a) a polyethylene terephthalate having an intrinsic viscosity of between about 0.5 and 1.2 as measured at 25° C. using a solvent consisting of 60 percent by weight phenol and 40 percent by weight of tetrachloroethane,
    (b) a rubber-free copolymer or a rubber-modified graft copolymer of a styrene and maleic anhydride wherein said rubber-free copolymer contains from about 5 to about 35 percent by weight of maleic anhydride and from about 95 to about 65 percent by weight of a styrene or wherein said rubber-modified graft copolymer contains from about 5 to about 35 percent by weight of maleic anhydride and about 95 to about 65 percent by weight of a styrene in the resin phase and from about 4 to about 30 percent by weight of rubber in the total graft copolymer,
  (c) glass fibers present within the range of from about 1 to about 10 percent by weight based on the weight of (a) plus (b) plus (c), and
  (d) a nucleating agent that is an alkali metal salt of an aliphatic or aromatic monocarboxylic acid, an ionomer resin (sodium salt), boron nitride, a mixture of the sodium salts of tallow fatty acids and coconut fatty acids, talc or sodium carbonate, said nucleating agent being present within the range of from about 0.1 to about 5 parts per 100 parts of (a)
wherein (a) is present within the range of from about 10 to about 90 percent by weight based on the weight of (a) plus (b) and wherein (b) is present within the range of from about 90 to about 10 percent by weight based on the weight of (a) plus (b).

19. A composition of claim 18 wherein said nucleating agent is sodium stearate, sodium 2-chloro-4-nitrobenzoate, sodium montanate, potassium stearate, sodium propionate, sodium acetate, sodium n-butyrate, sodium caprylate or sodium myristate or an ionomer resin (sodium salt) having a melt flow index of from about 1.0 to about 2.8 g/10 min. as measured by ASTM procedure D 1236.

20. A composition of claim 18 wherein (c) is within the range of about 3 to about 10 percent by weight based on the weight of (a) plus (b) plus (c) and wherein (d) is present within the range of from about 0.5 to about 3 parts per 100 parts of (a).

21. A composition of claim 18 wherein the rubber-free copolymer of (b) consists essentially of styrene and maleic anhydride and wherein the rubber-modified graft copolymer of (b) consists essentially of styrene and maleic anhydride.

22. A process for producing articles having good surface appearance by injection molding a thermoplastic composition of claim 8 at a hold pressure of about 5,000 to about 10,000 psi.

23. An article produced by injection molding the composition of claim 8.

24. An article of claim 23 having a Gardner 60° Gloss of at least about 60%.

* * * * *